US009300153B2

(12) United States Patent
Fujiyama

(10) Patent No.: US 9,300,153 B2
(45) Date of Patent: Mar. 29, 2016

(54) CHARGING CONTROL UNIT

(75) Inventor: Toshiya Fujiyama, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 326 days.

(21) Appl. No.: 14/116,457

(22) PCT Filed: Apr. 26, 2012

(86) PCT No.: PCT/JP2012/002866
§ 371 (c)(1), (2), (4) Date: Jan. 17, 2014

(87) PCT Pub. No.: WO2012/153477
PCT Pub. Date: Nov. 15, 2012

(65) Prior Publication Data

US 2014/0176043 A1 Jun. 26, 2014

(30) Foreign Application Priority Data

May 12, 2011 (JP) ................................ 2011-107704

(51) Int. Cl.
*H02J 7/00* (2006.01)
*H01M 14/00* (2006.01)
*H02J 3/38* (2006.01)

(52) U.S. Cl.
CPC ........... *H02J 7/0052* (2013.01); *H01M 14/005* (2013.01); *H02J 3/385* (2013.01); *Y02E 10/58* (2013.01)

(58) Field of Classification Search
CPC ........................................................ H02J 3/385
USPC ......................................................... 320/101
See application file for complete search history.

(56) References Cited

U.S. PATENT DOCUMENTS 8,773,077 B1 * 7/2014 Elmes .................. H02J 7/0072 320/128
2009/0108827 A1 4/2009 Sasaki et al.

FOREIGN PATENT DOCUMENTS

| | | | |
|---|---|---|---|
| JP | 60-69720 | A | 4/1985 |
| JP | 2-156313 | A | 6/1990 |
| JP | 7-222365 | A | 8/1995 |
| JP | 7-302129 | A | 11/1995 |
| JP | 2000-122739 | A | 4/2000 |
| JP | 2007-306648 | A | 11/2007 |
| JP | 2010-186338 | A | 8/2010 |
| JP | 2011-24294 | A | 2/2011 |

* cited by examiner

*Primary Examiner* — Thuan Do
(74) *Attorney, Agent, or Firm* — Birch, Stewart, Kolasch & Birch, LLP

(57) ABSTRACT

The amount of power generated by a solar cell is used for charging more efficiently. An activation determination means 4 activates a charging control circuit 3 by allowing a maximum output current from a solar cell 1 to a GND potential to flow and detecting that the output current is equal to or greater than current consumption of the charging control circuit 3 instead of monitoring an unstable output voltage from the solar cell 1. Thus, the charging control circuit 3 can be activated more precisely in comparison to a case where an output voltage is monitored under the condition that the charging control circuit 3 is operated only by the amount of power generated by the solar cell. Thereby, a power instrument 2 is charged more efficiently with the amount of power generated by the solar cell.

20 Claims, 20 Drawing Sheets

CHARGING CONTROL UNIT

TECHNICAL FIELD

The present invention relates to a charging control unit for controlling charging of a power retaining device, such as a secondary battery or a super capacitor, with power generated from a solar cell.

BACKGROUND ART

This type of a conventional charging control unit is for controlling charging to efficiently charge with fluctuating power from a solar cell.

FIG. 13 is a block diagram illustrating an exemplary configuration of essential parts of a conventional charging control unit. FIG. 14 is a diagram illustrating an output voltage—output current characteristic of a solar cell with photoirradiation intensity as a parameter.

In FIG. 13, as a conventional charging control unit 100, a charging control circuit 102 which enhances charging efficiency of a power instrument 103 and is suitable for a protection feature required in accordance with the type of the power instrument 103 when charging the power instrument 103, such as a secondary batter or a super capacitor, with power generated by a solar cell 101 receiving light, is used.

Further, power generated by a natural energy charger represented by the solar cell 101 greatly fluctuates in accordance with natural energy. Thus, an MPPT control feature (MPPT: Maximum Power Point Tracking) compliant with maximum power, which is needed to draw out generated power that fluctuates to the maximum degree, is required as a specification of such a charging control unit. The amount of power generated by the solar cell 101 increases in accordance with irradiation intensity of sun light. The relationship between the irradiation intensity and a power curve is as illustrated in FIG. 14.

The charging control unit 102 is a device prepared for transmitting power of the solar cell 101 to the power instrument 103 (secondary battery, super capacitor or the like). Thus, the driving power therefor should be sufficiently met with only power generated from the solar cell 101. When this is not possible, a reverse flow of power from the power instrument 103 to the charging control circuit 102 occurs while controlling charging, resulting in loss of power. For this reason, it is necessary to determine whether power generated by the solar cell 101 is equal to or greater than the driving power for the charging control circuit 102. A UVLO (Under Voltage Lock Out) circuit 104 for monitoring an output voltage of a solar cell to determine whether the voltage has risen to a prescribed voltage is employed as a representative activation determining circuit. The conventional charging control unit 100 is constituted with such a charging control circuit 102 and a UVLO circuit 104.

The UVLO circuit 104 is an activation determining circuit that is widely employed in common power source ICs. The UVLO circuit 104 is activated when a primary power source voltage (in this case, solar cell output voltage) is equal to or greater than a prescribed voltage condition. In many cases, the UVLO circuit 104 has a hysteresis feature for the determination voltage in order to prevent successive malfunctions, such as activate→stop→activate, due to UVLO observed voltages fluctuating from a rush current to a capacitor that can occur when the charging control circuit 102 is activated or another rush current at the time of activating a circuit. The UVLO circuit 104 is commonly used and is also disclosed in Patent Literature 1.

CITATION LIST

Patent Literature

Patent Literature 1: Japanese Patent No. 2007-306648

SUMMARY OF INVENTION

Technical Problem

The above-described charging control unit 100 for the conventional solar cell 101 is configured to monitor an output voltage from the solar cell 101 with the UVLO circuit 104 to activate the charging control circuit 102 when an output voltage is equal to or greater than a predetermined voltage. However, an output voltage of the crystalline solar cell 101, which is widely used for efficiency and cost, has a negative temperature characteristic of about −2 mV/° C. per cell, similar to that of a bipolar transistor or a diode. For this reason, even if an activatable predetermined voltage is reached, the output voltage decreases from a rise in temperature due to photoelectric conversion unique to the solar cell 101. In this manner, a large difference in the amount of power generated by the solar cell 101 occurs due to temperatures, and a difference in the amount of power generated by the solar cell 101 of about 1:10 occurs due to a difference in the amount of light caused by weather, and if margin is further added thereto, a range of operating voltages in which the charging control circuit 102 can in fact operate is further limited. Thus, in such case, there was an issue that the amount of power generated by the solar cell 101 could not be used efficiently.

In order to allow operation in a wider range of temperature conditions, a UVLO circuit 104 with a temperature characteristic that is proportional to that of the solar cell 101 is required. However, since the elements are not identical, a temperature disparity between the solar cell 101 and the charging control circuit 102 sides cannot be completely canceled out.

The present invention solves the above-described conventional problem and aims to provide a charging control unit that is capable of charging a power instrument with the amount of power generated by a solar cell more efficiently.

Solution to Problem

A charging control unit according to the present invention for controlling charging of a power retaining means with power from a solar cell that generates power by receiving light by a charging control circuit is provided, the charging control unit comprising: an activation determining means for activating the charging control circuit by monitoring an output current from the solar cell to a reference potential and determining that the output current has reached a baseline current value, thereby achieving an objective described above.

Preferably, in a charging control unit according to the present, the baseline current value is a current equal to or greater than current consumption that enables driving the charging control circuit.

Still preferably, in a charging control unit according to the present invention, the activation determining means comprises: a current monitoring section for monitoring the output current from the solar cell; a first switching means for turning on or off the current monitoring section to a reference potential side; and a first determination means for allowing the output current from the solar cell to flow from the current monitoring section to the reference potential side via the first switching means and monitoring the output current as a monitored current to determine that the monitored current has reached the baseline current value to output a switch controlling signal for turning off the first switching means and turning on from off a second switching means for turning on or off the output current from the solar cell to the charging control circuit and to control the activation of the charging control circuit.

Still preferably, in a charging control unit according to the present invention, the activation determining circuit comprises: a current monitoring section for monitoring the output current from the solar cell; a first switching means for turning on or off the current monitoring section to a reference potential side; a second determination means for allowing the output current from the solar cell to flow from the current monitoring section to the reference potential side via the first switching means and monitoring the output current as a monitored current value to determine that the monitored current value has reached the baseline current value to output a switch controlling signal for turning off the first switching means and turning on from off a second switching means for turning on or off the output current from the solar cell to the charging control circuit; and a delay circuit for controlling the activation of the charging control circuit by outputting a delay signal that is delayed a predetermined time from a point when the monitored current has reached a predetermined current to the charging control circuit as an activation controlling signal.

Still preferably, in a charging control unit according to the present invention, a predetermined delay time from the point when the monitored current has reached the reference current value is set to 0 when driving power for the charging control circuit can be met even when an amount of power generation decreases due to a rise in temperature which is presumed during an initial determination of the amount of power generation comparing the monitored current to the predetermined current value.

Still preferably, in a charging control unit according to the present invention, a predetermined delay time from the point when the monitored current has reached the reference current value is a fixed value determined from a product structure of the solar cell when an amount of power generation decreases due to a rise in temperature which is presumed during an initial determination of the amount of power generation and driving power for the charging control circuit cannot be met.

Still preferably, in a charging control unit according to the present invention, a predetermined delay time from the point when the monitored current has reached the reference current value is a variable value set in accordance with ambient temperature when an amount of power generation decreases due to a rise in temperature which is presumed during an initial determination of the amount of power generation and driving power for the charging control circuit cannot be met.

Still preferably, in a charging control unit according to the present invention, a predetermined delay time from the point when the monitored current has reached the reference current value is a stable transition time of power fluctuation due to a rise in surface temperature of the solar cell.

Still preferably, in a charging control unit according to the present invention, the stable transition time of power fluctuation due to a rise in surface temperature of the solar cell is a time in which the monitored current fluctuates.

A charging control unit according to the present invention for controlling charging of a power retaining means with power from a solar cell that generates power by receiving light by a charging control circuit is provided, where the charging control unit further comprises a solar cell temperature information detecting means for detecting a value of a rise in temperature of the solar cell itself that is generated when the solar cell generates power by receiving light and monitors an output current from the solar cell to a reference potential to activate the charging control circuit by detecting that the amount of power generated by the solar cell calculated from the output current and the value of rise in temperature has reached a baseline amount of power generated, thereby achieving an objective described above.

A charging control unit according to the present invention for controlling charging of a power retaining means with power from a solar cell that generates power by receiving light by a charging control circuit is provided, the charging control unit comprising: a solar cell temperature information detecting means for detecting a temperature value or a value of a rise in temperature of the solar cell itself that is generated when the solar cell generates power by receiving light; and an activation determining means for activating the charging control circuit by determining that the detected temperature value or the value of the rise in temperature or an amount of power generated by a solar cell calculated therefrom has reached a baseline temperature value, a baseline value of rise in temperature or a baseline amount of power generation, thereby achieving an objective described above.

Still preferably, in a charging control unit according to the present invention, the baseline temperature value, the baseline value of rise in temperature or the baseline amount of power generation is the temperature value, the value of rise in temperature, or the amount of power generation of the solar cell from which an output power value is obtained from the solar cell beyond the current consumption that enables driving of the charging control circuit.

Still preferably, in a charging control unit according to the present invention, the activation determining means comprises a third determination means for activating the charging control circuit by determining that the temperature value or the value of the rise in temperature detected by the solar cell temperature information detecting means or the amount of power generated by the solar cell calculated therefrom has reached the baseline temperature value, the baseline value of rise in temperature or the baseline amount of power with generation the determination circuit.

Still preferably, in a charging control unit according to the present invention, the activation determining means further comprises an ambient temperature information detecting means for detecting ambient temperature information, and the third determination means adjusts a determination baseline level from the ambient temperature information of the ambient temperature information detecting means and determines that the temperature value or the value of the rise in temperature detected or the amount of power generated by the solar cell calculated therefrom has reached the adjusted determination baseline level to commence controlling charging by the charging control circuit.

A charging control unit according to the present invention for controlling charging of a power retaining means with power from a solar cell that generates power by receiving light by a charging control circuit is provided, the charging control unit comprising: an element for generating power from temperature differences provided between a solar cell that generates power by receiving light and a heat dissipation element; a power source controlling circuit for enabling a supply of thermoelectric power from the element for generating power from temperature difference as a power source;

and an activation determining means for activating the charging control circuit by determining that a power value supplied from the power source controlling circuit or the element for generating power from temperature difference has reached a baseline power value, thereby achieving an objective described above.

Still preferably, in a charging control unit according to the present invention, the activation determining means comprises a fourth determination means, which waits until the thermoelectric power converted from heat generated by the solar cell itself that is generated when the solar cell generates power by receiving light or power obtained from the thermoelectric power passing through the power source controlling circuit has reached the baseline power value and stabilizes and determines that the thermoelectric power or the power from the power source controlling circuit has reached the baseline power value to output a switch controlling signal for turning on from off each of a second switching means and a third switching means for turning on or off output power from the solar cell and the power source controlling circuit to the charging control circuit to activate the charging control circuit.

A charging control unit according to the present invention is provided, where a plurality of solar cells are provided, and each switching means is provided between the plurality of solar cells and the charging control circuit, and the activation determining means detects the presence or absence of power generation for each of the plurality of solar cells and performs a control to shut off a switching means between a solar cell determined as not running to generate power and the charging control circuit, thereby achieving an objective described above.

A charging control unit according to the present invention for controlling charging of a power retaining means with power from a solar cell that generates power by receiving light by a charging control circuit is provided, the charging control unit comprising: an activation determining means for determining whether each output current from a plurality of solar cells provided has reached a baseline current value for each solar cell, and performs a control so that only an output terminal of a solar cell that has reached the baseline current value is connected to the charging control circuit to activate the charging control circuit when it is determined that the baseline current value has been reached, thereby achieving an objective described above.

Still preferably, in a charging control unit according to the present invention, the charging control circuit maintains an activation state when charging control by the activation determining means is commenced.

Still preferably, in a charging control unit according to the present invention, a switching means is provided between each of the plurality of solar cells and the charging control circuit, and the activation determining means detects the presence or absence of power generation for each of the plurality of solar cells and performs a control to shut off a switching means between a solar cell determined as not reaching the baseline current value and not running to generate power and the charging control circuit.

Still preferably, in a charging control unit according to the present invention, a charging control stopping condition for the solar cell that is not running to generate power is set to be at a point where output current does not reach the baseline current value during a predetermined period when the output current from the solar cell is monitored.

Still preferably, in a charging control unit according to the present invention, a charging control stopping condition after charging control of the charging control circuit has commenced is set to be a point when a reverse flow current from the charging control circuit to the solar cell side is detected.

Still preferably, in a charging control unit according to the present invention, the charging control circuit is activated when at least one determination for activation among a plurality of determinations for activation for the plurality of solar cells is detected.

Still preferably, in a charging control unit according to the present invention, the charging control circuit is activated by determining that a sum of output currents from the plurality of solar cells has reached the baseline current value used as an activation determination prescribed value, which is set as a current with which charging control can be performed.

Still preferably, in a charging control unit according to the present invention, controlling is performed so that each of differences between each output current of the plurality of solar cells is compared, and when each of the differences reaches a predetermined value, a connection of a solar cell with a low amount of power generation to the charging control circuit is cut off and an amount of power generated by the solar cell with the low amount of power generation is subtracted from the sum of output currents for comparing with the baseline current value.

A charging control unit according to the present invention for controlling charging of a power retaining means with power from a solar cell that generates power by receiving light by a charging control circuit is provided, the charging control unit comprising: a monitoring circuit for an output current provided between an output terminal of the solar cell and a reference potential; and a fifth determination means for determining that the output current detected as the monitoring circuit has reached a baseline current value, linking the output terminal of the solar cell and the charging control circuit, increasing impedance of the monitoring circuit, and activating the charging control circuit, thereby achieving an objective described above.

Still preferably, in a charging control unit according to the present invention, when an output voltage of the solar cell increases to a voltage equal to or greater than an input range of the charging control circuit by a load of the charging control circuit lightening, the fifth determination means inhibits the output voltage of the solar cell by decreasing impedance of monitoring circuit.

A charging control unit according to the present invention for controlling charging of a power retaining means with power from a solar cell that generates power by receiving light by a charging control circuit is provided, the charging control unit comprising: a first switch SW1 connected between an output terminal of the solar cell and a low potential terminal; a second switch SW2 connected between the output terminal of the solar cell and the charging control circuit that draws power from the solar cell; an activation determining circuit for controlling the activation of the charging control circuit when an amount of current flowing to the second switch SW2 is equal to or greater than a set value for determining activation which is set; a third switch SW3 connected between an output terminal of the charging control circuit and a first power retaining device; a fourth switch SW4 connected between an input terminal of the charging control circuit and the first power retaining device; a charger for a second power retaining device, connected between the output terminal of the charging control circuit and the second power retaining device; a fifth switch SW5 connected between an output terminal of the charger for the second power retaining device and the input terminal of the charging control circuit, where the activation determining means controls so that the second switch SW2 and the third switch SW3 are shorted and the rest of the switches SW4-SW6 are opened when charging the first power retaining device with electric power from the solar cell, the charger is activated to charge the second power retaining device in parallel with the first power retaining device when the second power retaining device is charged, the third switch SW3 is opened for charging when only the second power retaining device is charged, and charging is performed from the first power retaining device to the second power retaining device after the second switch SW2 is shorted, the charging control circuit is stopped, and the rest of the switches are opened when it is judged that power of the solar cell is insufficient, thereby achieving an objective described above.

Preferably, in a charging control unit according to the present invention, when a memory effect is manifested in the second power retaining device and power retaining capability decreases, the activation determining means eliminates the memory effect and regenerates power by stopping the charger, shorting the fifth switch SW5 and the fourth switch SW4, opening the rest of the switches, and regenerating power stored in the second power retaining device to the first power retaining device to perform over-discharge.

The functions of the present invention will be described hereinafter with the configurations described above.

In the present invention, a charging control unit for controlling charging of a power retaining means by using a charging control circuit with power from a solar cell that generates power by receiving light has an activation determining means for activating the charging control circuit by monitoring an output current from the solar cell with respect to a reference potential and determining that the output current has reached a predetermined current.

Thereby, the activation determining means activates the charging control circuit by allowing the output current from the solar cell to flow and determining that the output current, which does not greatly change, is detected to be equal to or greater than current consumption of the charging control circuit, instead of the activation determining means monitoring an output voltage from the solar cell, which is unstable and greatly changes, as is the convention. Thus, the charging control circuit can be activated more precisely in comparison to cases in which an output voltage is monitored as is the convention. Thereby, charging can be performed more efficiently with the amount of power generated by a solar cell.

Advantageous Effects of Invention

From the above, according to the present invention, a charging control circuit is activated by allowing an output current from a solar cell to flow and detecting that the output current, which does not greatly change, is equal to or greater than current consumption of the charging control circuit, instead of an activation determining means monitoring an output voltage from the solar cell, which is unstable and greatly changes, as is the convention. Thus, the charging control circuit can be activated more precisely in comparison to cases where an output voltage is monitored, under the condition that the charging control circuit is operated only with the amount of power generated by the solar cell. Thereby, a power instrument 2 can be charged and used more efficiently with the amount of power generated by a solar cell.

REFERENCE SIGNS LIST

Figure 1:
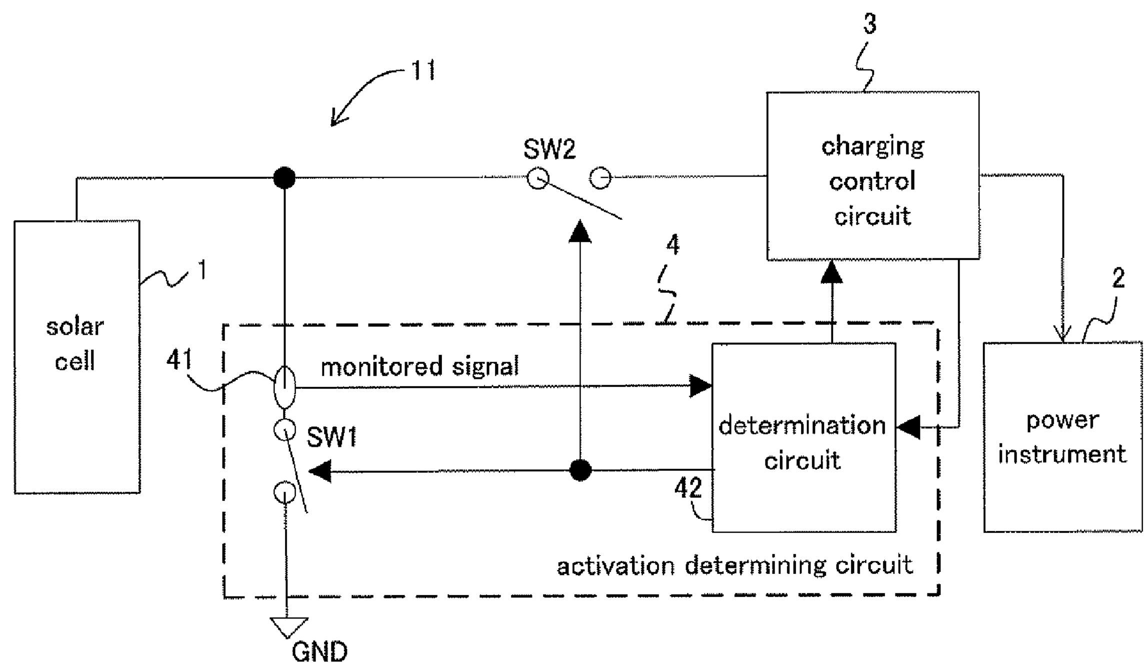
FIG. 1 is a block diagram illustrating an exemplary configuration of essential parts of a charging control unit in Embodiment 1 of the present invention.

1, 1A, 1D1, 1D2 solar cell
2 power instrument (power retaining means)
21 charger
22 nickel metal hydride battery
23 Li+ secondary battery
24 USB
3 charging control circuit

4, 4A-4F, 4B1 activation determining circuit (activation determining means)

41 current monitoring section

42, 42A-42D, 42D1, 42D2 determination circuit

42A determination circuit (second determining means)

421 environmental condition outputting section

422 determination baseline outputting section

423, 46 comparator

424 delay adjustment section

421', 422' monitoring circuit

423' logic circuit (OR gate)

424', 427' latch circuit (flip-flop circuit)

425' computation circuit

426' stop determining circuit

43 delay circuit (delay means)

431 fixed delay section

432 variable delay section

44, 51 temperature sensor

45 group of variable resistances

52 element for generating power from temperature differences

53 heat dissipating element

6 power source controlling circuit

11-17 charging control unit

SW1-SW6, SW21, SW22 switch

DESCRIPTION OF EMBODIMENTS

Hereinafter, Embodiments 1-6 of a charging control unit of the present invention will be described in detail while referring to the drawings.

Embodiment 1

FIG. 1 is a block diagram illustrating an exemplary configuration of essential parts of a charging control unit in Embodiment 1 of the present invention.

In FIG. 1, a charging control unit 11 of Embodiment 1 comprises: a charging control circuit 3 for controlling charging of a power instrument 2 used as a power retaining means such as a secondary battery or a super capacitor with power generated from a solar cell 1 that generates power by receiving light; and an activation determining circuit 4 used as an activation determining means for monitoring an output current from the solar cell 1 with respect to a GND potential used as a reference potential to determine that the output current has reached a predetermined current.

In this manner, in the charge controlling unit 11 of Embodiment 1, the activation determining circuit 4 allows a maximum output current to flow from the solar cell 1 to the GND current and monitors an output current, which does not greatly change, in comparison to an output voltage, instead of monitoring the output voltage of the solar cell 1, which greatly changes, to activate the charging control circuit 3 when the output current is detected to be equal to or greater than a predetermined value in order to reduce an effect due to ambient temperature. Although for the solar cell 1, the amount of current is at a maximum when light hits and steadily declines thereafter by generating heat, the amount of current is stable without a large change. However, an output voltage is not stable, changing greatly from 0. Thus, the output current is monitored instead of the output voltage. In this case, it is sufficient to control the activation determining circuit 4 so that the charging control circuit 3 is activated when the output current is equal to or greater than current consumption that can drive the charging control circuit 3. In addition, there is a risk of the output voltage of the solar cell 1 being in an unstable state of oscillating up and down.

The activation determining circuit 4 comprises: a current monitoring section 41, such as a resistant component or a current mirror means, for monitoring an output current that flows from the solar cell 1 to the GND side; a switch SW1 used as a first switching means for turning on/off the current monitoring section 41 used as a reference potential to the GND side; and a determination circuit 42 used as a first determination means for allowing an output current from the solar cell 1 to flow from the current monitoring section 41 to the GND terminal side through the switch SW1 and monitoring the output current as a monitored current to output a switch controlling signal for turning off the switch SW1 and turning on a switch SW2 used as a second switching means for turning on/off an output current from the solar cell 1 to the charging control circuit 3 when the monitored current has reached a predetermined current to control the activation of the charging control circuit 3.

As described above, the charging control circuit 3 and the activation determining circuit 4 are connected in parallel to an output terminal of the solar cell 1. The power instrument 2 used as a power retaining means represented by a lithium ion secondary battery or a super capacitor is connected to the output side of the charging control circuit 3. The activation determining circuit 4 is disposed between the output terminal of the solar cell 1 and a low potential terminal (reference potential terminal), such as the GND terminal. An output current from the solar cell 1 is shorted and allowed to flow to the GND terminal side through the switch SW1 when operation of the charging control circuit 3 is stopped, i.e., when a power generation voltage of the solar cell 1 is not sufficiently high. As output power curves of the solar cell 1, an activation determining region illustrated in FIG. 2 corresponds thereto.

Figure 2:
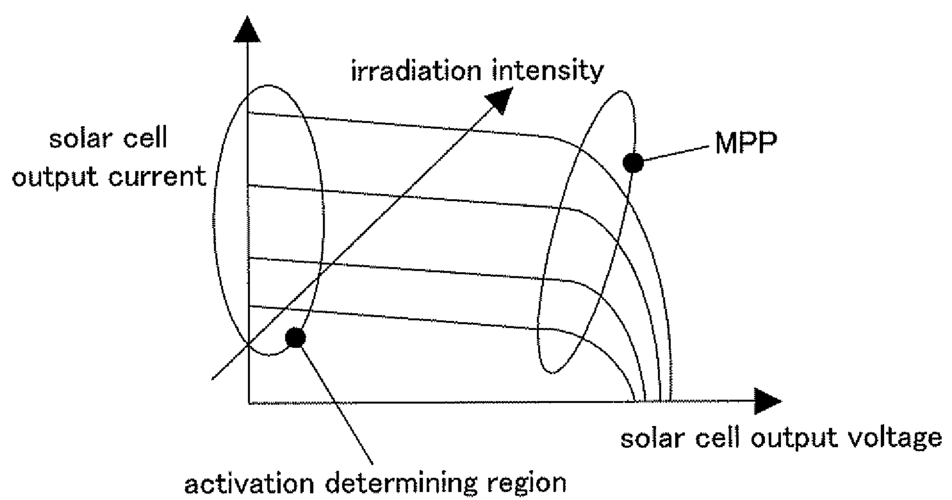
FIG. 2 is a diagram illustrating an output voltage-output current characteristic of a solar cell with photoirradiation intensity as a parameter.

As illustrated in FIG. 2, an output current from the solar cell 1 increases proportionally to the amount of light (irradiation intensity) irradiated on the solar cell 1. The current consumption of the charging control circuit 3 is a value that can be estimated to a certain degree. Thus, an activation determining current for determining whether the required amount of current can be supplied by the output current of the solar cell 1 can be calculated by the following formula.

$$\text{Activation determining current}=(\text{control circuit current consumption}\times\text{boost ratio})\div\text{conversion efficiency}\div\text{MPPT ratio}$$

wherein, MPPT ratio=output current of solar cell at the time of MPPT÷output current of solar cell at the time of monitoring.

From the above, accordingly to Embodiment 1, instead of monitoring unstable output voltages from the solar cell 1, the activation determining circuit 4 activates the charging control circuit 3 by allowing a maximum output current to flow from the solar cell 1 to the GND potential and detecting that the output current is equal to or greater than the current consumption of the charging control circuit 3. Thus, the charging control circuit 3 can be activated more precisely in comparison to cases where an output voltage is monitored, under the condition that the charging control circuit 3 is operated only with the amount of power generated by the solar cell. Thereby, a power instrument 2 can be charged more efficiently with the amount of power generated by a solar cell.

While it was not specifically explained in Embodiment 1, when the solar cell 1 generates power, the solar cell 1 itself generates heat of about 10-40° C. slowly over time in accordance with irradiation intensity. For this reason, it is essential to dispose the charging control circuit 3 and the activation determining circuit 4 in the vicinity of the solar cell 1 in order to apply a correction with respect to the ambient temperature to such circuits themselves. Thus, the freedom in designing an application is greatly impaired. Further, an output current of the solar cell 1 prominently reacts to irradiation intensity, i.e., generated power, in comparison to an output voltage. Thus, an output current is suitable for determining activation, but is greatly affected by a difference in temperatures between the solar cell 1 and charging control circuit 3.

Although it was not specifically explained in Embodiment 1, the temperature of the solar cell 1 itself slowly rises during power generation by the solar cell 1. Since the amount of power generated and the temperature of the solar cell 1 are in an inversely proportional relationship, there is a possibility that driving of the charging control circuit 3 becomes impossible to maintain due to a decrease in the amount of power generated by the solar cell 1 after a rise in temperature of the solar cell 1, after power generated by the solar cell 1 is determined to be power that can drive the charging control circuit 3. This phenomenon must be prevented, as there is a possibility of the phenomenon causing an abnormal operation of repeating activation and stopping of the charging control circuit 3. For this reason, a case where a delay circuit for providing a delay time is installed so that the charging control circuit 3 is not activated in response to an output determining signal of the determination circuit 42 while the temperature of the solar cell 1 rises will be explained in detail in the following Embodiment 2.

Embodiment 2

In the above-described Embodiment 1, a case was explained where an output current (amount of power generation) from the solar cell 1 to the GND potential is monitored as a monitored current to activate the charging control circuit 3 when the monitored current is detected to be equal to or greater than current consumption of the charging control circuit 3. However, in Embodiment 2, a case will be explained where the charging control circuit 3 is activated after a predetermined time delay from the point when the detected monitored current has reached a predetermined current in addition to the case of the above-described Embodiment 1.

Figure 3:
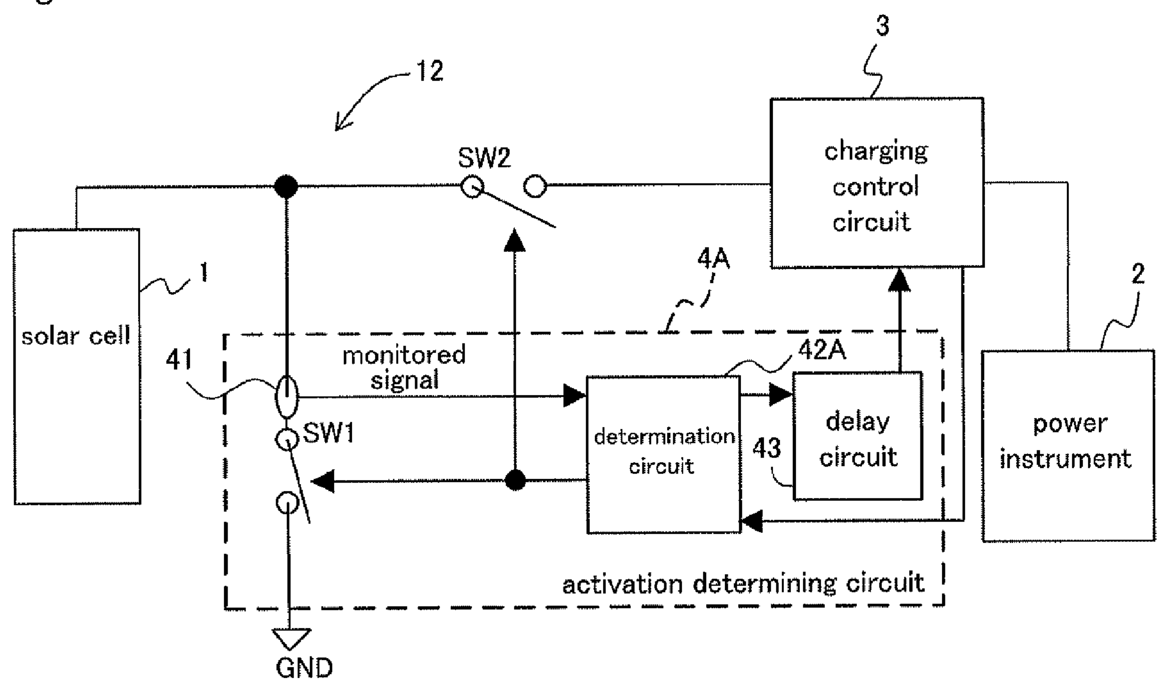
FIG. 3 is a block diagram illustrating an exemplary configuration of essential parts of a charging control unit in Embodiment 2 of the present invention.

FIG. 3 is a block diagram illustrating an exemplary configuration of essential parts of a charging control unit in Embodiment 2 of the present invention.

In FIG. 3, a charging control unit 12 of Embodiment 2 comprises: a charging control circuit 3 for controlling charging of a power instrument 2 used as a power retaining means such as a secondary battery or a super capacitor with power generated from a solar cell 1 that generates power by receiving light; and an activation determining circuit 4A for monitoring an output current flowing from the solar cell 1 to the GND side to activate the charging control circuit 3 with a predetermined time delay from the point when the output current has reached a predetermined current value. The predetermined current value in this case is a current value that is equal to or greater than current consumption that enables driving of the charging control circuit 3.

The activation determining circuit 4A comprises: a current monitoring section 41, such as a resistant component or a current mirror means, for monitoring an output current from the solar cell 1; a switch SW1 used as a first switching means for turning on/off the current monitoring section 41 to the GND side used as a reference potential (or low potential); a determination circuit 42A used as a second determination means for allowing an output current from the solar cell 1 to flow from the output current terminal 41 to the GND terminal side via the switch SW1 and monitoring the output current as a monitored current to output a switch controlling signal for turning off the switch SW1 and turning on from off a switch SW2 used as a second switching means for turning on/off an output current from the solar cell 1 to the charging control circuit 3 when the monitored current has reached a predetermined current; and a delay circuit 43 used as a delay means for activating the charging control circuit 3 by outputting a delay signal that is delayed a predetermined time from the point when the monitored current has reached the predetermined current to the charging control circuit 3.

In many cases, the time until a rise in temperature of the solar cell 1 stabilizes is determined by the structure/shape of a solar cell module. Thus, a delay time (predetermined time delay from the point when a monitored current has reached a predetermined current) determined from this condition is determined by the product structure of the solar cell 1 itself.

Figure 4:
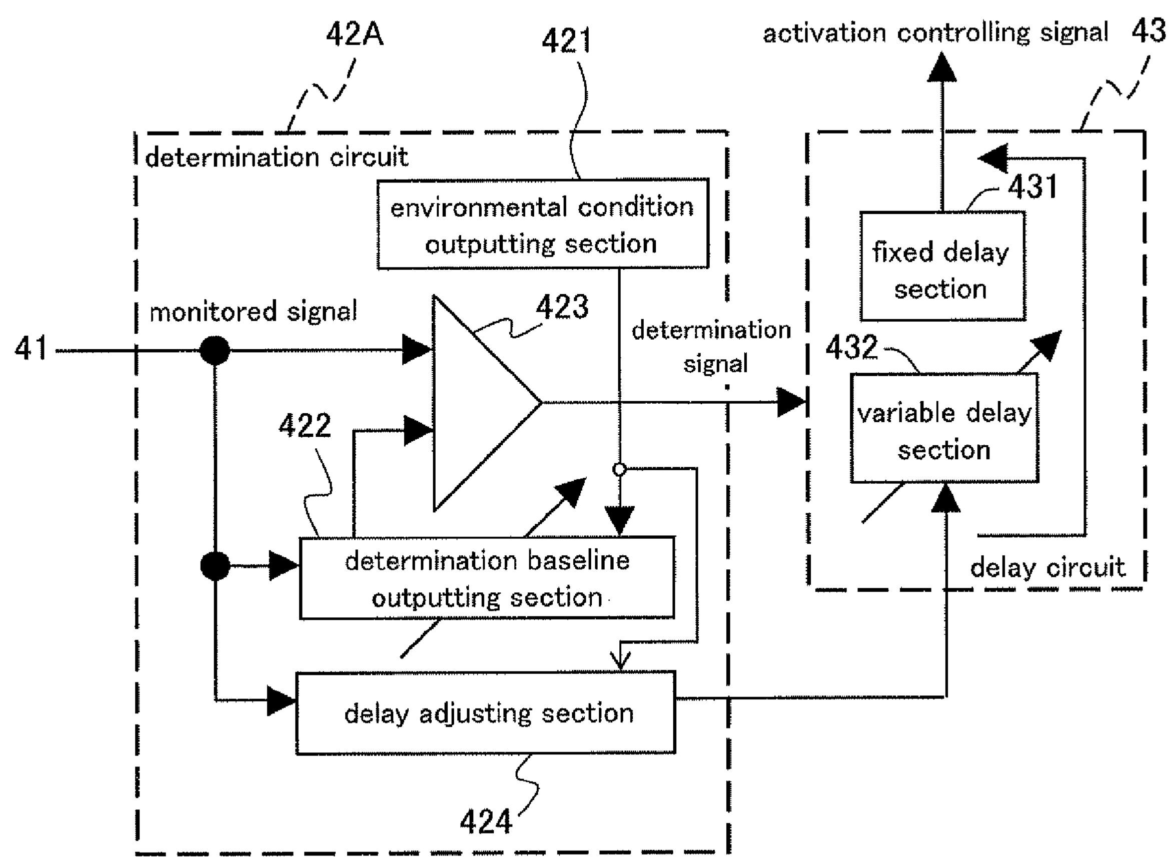
FIG. 4 is a block diagram illustrating the detailed configurations of the determination circuit and the delay circuit of FIG. 3.

FIG. 4 is a block diagram illustrating the detailed configurations of the determination circuit 42 and the delay circuit 43 of FIG. 3.

In FIG. 4, the determination circuit 42A comprises: an environmental condition outputting section 421 for setting and outputting an environmental condition value, such as ambient temperature or output load; a determination baseline outputting section 422 for adjusting and outputting a determination baseline level in accordance with the environmental condition value from the environmental condition outputting section 421; a comparator 423 for comparing a signal level of a monitored signal from the current monitoring section 41 and a determination baseline level from the determination baseline outputting section 422 and outputting a determination signal in accordance with the difference between the signal level of the monitored signal and the determination baseline level when the signal level of the monitored signal exceeds the determination baseline level; and a delay adjusting section 424 for adjusting a delay time in accordance with the monitored signal indicating the amount of power generated and the environmental condition value.

Even under the same irradiation intensity and under the same heat capacity of the solar cell 1 itself, the rate of rise in temperature from generating power is different between a cold day (e.g., −10° C.) and a hot day (e.g., 30° C.). Thus, the environmental condition outputting section 421 detects a peripheral temperature of a chip with a thermometer or the like and sets an environmental condition value so as to adjust a determination baseline level in accordance with the detected peripheral temperature.

The determination baseline outputting section 422 has a determination baseline level, which can be output, for determining whether the charging control circuit 3 can be driven by the amount of power generated by the solar cell 1. However, when current consumption of the charging control circuit 3 fluctuates due to an environmental condition such as the ambient temperature or outputting load, environmental condition information is given from the environmental condition outputting section 421 to the determination baseline outputting section 422 for changing the output determination baseline level. Further, depending on output power from the solar cell 1, such environmental condition information is utilized in changing the output determination baseline level when loss by the charging control circuit 3 changes.

Since the amount of rise in temperature changes depending on the amount of power generated by the solar cell 1, the delay adjusting section 424 outputs a delay signal so as to adjust a delay time in accordance with a monitored signal indicating the amount of power generated by the solar cell 1 and in accordance with an environmental condition value from the environmental condition outputting section 421. Although a delay time that is output from the delay adjusting section 424 is determined by the heat capacity of the body of the solar cell 1, activation time of the charging control circuit 3 can be more accurately expedited and charging efficiency can be enhanced by using a different delay time, for example, between a temperature rising only 20° C. from −10° C. and a temperature rising only 20° C. from 20° C.

The comparator 423 outputs a determination signal in accordance with the difference between a signal level of a monitored signal and a determination baseline level at a point when the signal level of the monitored signal has exceeded the determination baseline level. To this end, in a delay circuit 43, when the difference between the signal level of the monitored signal and the determination baseline level is greater than a sufficiently large first predetermined value (inclusive of the first predetermined value), an activation controlling signal is output to the charging control circuit 3 at the time of outputting a determination signal, i.e. at delay time of "0", to activate the charging control circuit 3. That is, a predetermined delay time from the point when a monitored current has reached a predetermined current in the comparator 423 is set to 0 when driving power for the charging control circuit 3 can be sufficiently met even when the amount of power generated decreases due to a rise in temperature which is presumed during the initial determination of the amount of power generation comparing the monitored current to the predetermined current value.

Further, the delay circuit 43 selectively drives a fixed delay section 431 for outputting an activation controlling signal to the charging control circuit 3 after delaying a predetermined time with a fixed value from the point when a determination signal has been output from the determination circuit 42A when the difference between a signal level of a monitored signal and a determination baseline level is in the range of a second predetermined value (inclusive of the second predetermined value) to the first predetermined value (exclusive of the first predetermined value). A predetermined delay time from the point when a monitored current has reached a predetermined current in the comparator 423 is determined from the product structure reflecting the heat capacity of the solar cell itself.

Furthermore, the delay circuit 43 selectively drives a variable delay section 432 for outputting an activation controlling signal in accordance with a delay signal from the delay adjusting section 424 from the point when a determination signal from the determination circuit 42A has been output when the difference between a signal level of a monitored signal and a determination baseline level is in the range of 0 to the second predetermined value (exclusive of the second predetermined value).

With the above-described configuration, first, a signal level of a monitored signal from the current monitoring section 41, which corresponds to an output current from the solar cell 1, is compared to a baseline level from the determination baseline outputting section 422 by the comparator 423.

Next, when such a determination condition is met in the comparator 423, a determination signal from the comparator 423 is output to the delay circuit 43 and an activation controlling signal is output to the charging control circuit 3 via the delay circuit 43. Thereby, the charging control circuit 3 is activated and the power instrument 2 is charged with power from the solar cell 1 for use.

At this time, when the difference between the signal level of the monitored signal and the determination baseline level is sufficiently large, the activation controlling signal is output to the charging control circuit 3 at the time of outputting the determination signal, i.e., with a delay time of "0", to activate the charging control circuit 3. That is, when driving power for the charging control circuit 3 can be sufficiently met, even when the amount of power generated decreases due to a rise in temperature which is presumed during the initial determination of the amount of power generation, the delay time for the activation controlling signal is cancelled to perform charging as long as possible. Thereby, the amount of charging is increased from efficiently generated power.

Further, a delay time from the point when the determination signal from the determination circuit 42A has been output is provided so as not to activate the charging control circuit 3 during a rise in temperature of the solar cell 1. Thus, it is possible to prevent an abnormal operation at the initial stages of power generation, where activation and stopping of the charging control circuit 3 is repeated, with the fixed delay section 431 or the variable delay section 432.

Thus, according to Embodiment 2, an output current from the solar cell 1 that generates power by receiving light is compared to an activation determination prescribed value based on current consumption for driving the charging control, which takes into consideration current consumption that can change depending on the usage environment such as a driving loss that can occur upon handling the generated power and temperature conditions. Then, controlling of charging is commenced after a delay of a certain time, with the time when the controlling of charging is determined to be possible with only power generated from the solar cell 1 as the starting point. Thereby, a malfunction of repeating activation and stopping of the charging control circuit 3 caused by heat generation by the solar cell 1 after the activation of the charging control circuit is prevented favorably.

Although it was not specifically explained in Embodiment 1 or 2, since the switch SW1 is opened after the activation of the charging control circuit 3, the monitored signal line cannot monitor the state of the solar cell 1. For this reason, after activation of the charging control circuit 3, an output of the determination circuit 42 maintains the operation controlling state of the charging control circuit 3, regardless of the state of a monitored signal. For stopping the charging, a determination of stopping is made from the amount of current supplied from solar cell 1→charging control circuit 3→power instrument 2. The specific method includes: a method of determining whether a current is sufficiently capable of driving the charging control circuit 3 from the amount of current flowing between the solar cell 1 and the charging control circuit 3; a method of determining whether a charging current is flowing backwards from the power instrument 2 to the charging control circuit 3; and the like. Further, when there is no more current flowing from the charging control circuit 3 to the power instrument 2, charging is completed to the capacity amount of the power instrument 2 itself. Thus, when this is used as a stopping determination baseline, a stopping factor other than the amount of power generated by the solar cell 1 is added.

Although it was not specifically explained in Embodiment 2, a predetermined delay time from the point when a monitored current from the current monitoring section 41 has reached a predetermined current is a stable transition time of power fluctuation due to rise in surface temperature of the solar cell 1, and the stable transition time is a time in which a monitored current value fluctuates.

Embodiment 3

In the above-described Embodiments 1 and 2, cases were explained where the amount of an output current from the solar cell 1 is monitored as a monitored current and the charging control circuit 3 is activated based on the monitored current. However, Embodiment 3 will explain a case where the amount of rise in temperature of the solar cell 1 is detected to activate the charging control circuit 3 based on the detected amount of rise in temperature of the solar cell 1.

Figure 5:
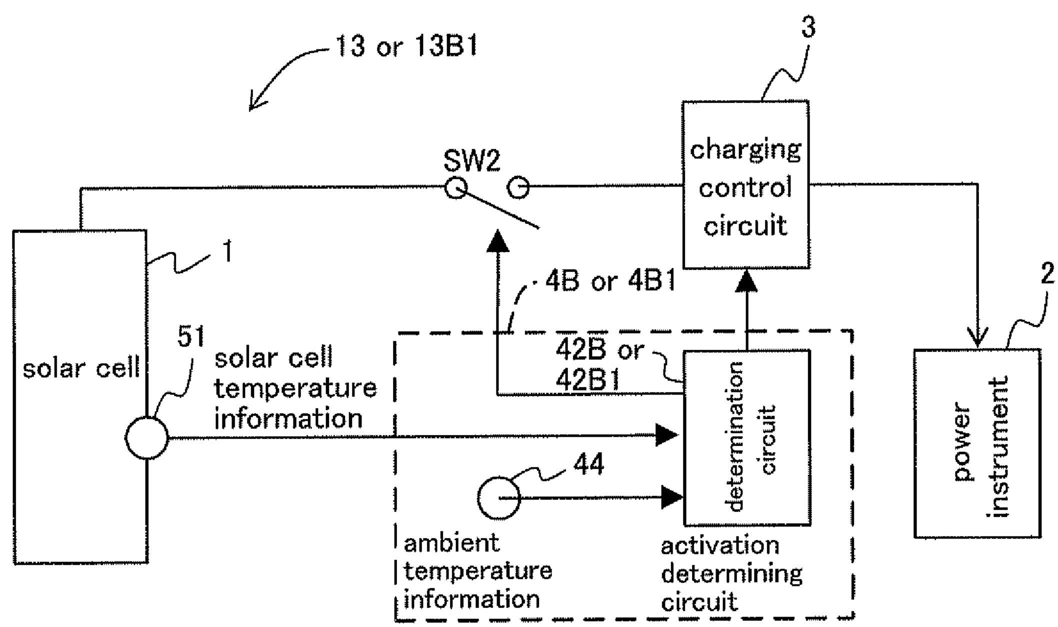
FIG. 5 is a block diagram illustrating an exemplary configuration of essential parts of a charging control unit in Embodiment 3 of the present invention.

FIG. 5 is a block diagram illustrating an exemplary configuration of essential parts of a charging control unit in Embodiment 3 of the present invention.

In FIG. 5, a charging control unit 13 of Embodiment 3 comprises: a charging control circuit 3 for controlling charging of a power instrument 2 used as a power retaining means such as a secondary battery or a super capacitor with power generated from a solar cell 1 that generates power by receiving light; and an activation determining circuit 4B used as an activation determining means for detecting a value of rise in temperature of the solar cell 1 itself which occurs when the solar cell 1 generates power by receiving light to commence controlling charging by the charging control circuit 3 at a point when the detected value of rise in temperature has reached a baseline value of rise in temperature. In this case, the baseline value of rise in temperature is a value of rise in temperature where an output current value beyond the current consumption that enables driving of the charging control circuit 3 is obtained from the solar cell 1.

The activation determining circuit 4B comprises: a temperature sensor 44 used as an ambient temperature information detecting means for detecting ambient temperature information; and a determination circuit 42B used as a third determination means for detecting a value of rise in temperature of the solar cell 1 itself per predetermined time as solar cell temperature information from a temperature sensor 51 used as a solar cell temperature information detecting means for converting a temperature of the solar cell 1 itself, which is generated when the solar cell 1 generates power by receiving light, to an electrical signal, and adjusting a baseline value of rise in temperature used as a determination baseline level from the ambient temperature information of the temperature sensor 44 to output a switch controlling signal for turning on from off a switch SW2 used as a second switching means for turning on/off an output current from the solar cell 1 to the charging control circuit 3 and to commence controlling charging by the charging control circuit 3 at a point when the detected value of rise in temperature has reached the adjusted baseline value of rise in temperature.

The temperature sensor 51 is placed at a location where rise in temperature of the solar cell 1 is most readily detected, e.g., central area on the backside of the solar cell 1. Thus, the temperature sensor 51 can detect the amount of rise in temperature per unit time at the initial stages of power generation of the solar cell 1.

The temperature sensor 44 is provided at a location where heat generated by the solar cell 1 itself does not reach. The temperature sensor 44 is constituted of a piezoelectric element and the like and is provided within an IC chip of the activation determining circuit 4B, which is spaced from the solar cell 1 itself. Even under the same irradiation intensity and under the same heat capacity of the solar cell 1 itself, the rate of rise in temperature from generating power is different between a cold day (e.g., −10° C.) and a hot day (e.g., 30° C.). Thus, the temperature of the IC chip is detected with the temperature sensor 44 to adjust the baseline value of rise in temperature as a determination baseline level in accordance with the detected ambient temperature.

Thus, according to Embodiment 3, it is possible to extract only the amount of rise in temperature of the body of the solar cell 1, and a precise determination on activation of the charging control circuit 3 which takes into consideration the rise in temperature of the body of the solar cell 1 can be made. Since rise in temperature takes a few minutes for solar cell 1 with a large body, use of this method is suited for determining activation of the charging control circuit 3 based on the value of rise in temperature where such a time can be afforded.

In Embodiment 3, the activation determining circuit 4B is configured so as to directly compare a detected value of rise in temperature with a baseline value of rise in temperature to commence controlling of the charging by the charging control circuit 3 at a point when the detected value of rise in temperature has reached the baseline value of rise in temperature. However, the configuration is not limited thereto. An activation determining circuit 4B1, which is a variant of the activation determining circuit 4B, may be configured so as to commence controlling of the charging by the charging control circuit 3 at a point when the amount of power generated by a solar cell calculated from the detected value of rise in temperature has reached a baseline amount of power generated. The baseline amount of power generated in this case is the amount of generated power where an output power value beyond the amount of power consumption that enables driving of the charging control circuit 3 is obtained from the solar cell 1.

The activation determining circuit 4B1 comprises: a temperature sensor 44 as an ambient temperature information detecting means for detecting ambient temperature information; and a determination circuit 42B1 as a 3A determination means for detecting a value of rise in temperature of the solar cell 1 itself from solar cell temperature information from a temperature sensor 51 used as a solar cell temperature information detecting means for converting a temperature of the solar cell 1 itself, which is generated when the solar cell 1 generates power by receiving light, to an electrical signal, and adjusting a baseline amount of generated power as a determination baseline level from the ambient temperature information of the temperature sensor 44 to output a switch controlling signal for turning on from off a switch SW2 used as a second switching means for turning on/off an output current from the solar cell 1 to the charging control circuit 3 and to commence controlling charging by the charging control circuit 3 at a point when the amount of power generated by a solar cell calculated from the detected value of rise in temperature has reached an adjusted baseline amount of power generated.

From the above-described configuration, the amount of power generated by the solar cell is estimated by calculation based on the solar cell temperature information obtained from the temperature sensor 51 that is connected to the solar cell 1, and determination on activation is made by the determination circuit 42B1. In this case, it is possible to accurately extract only the amount of rise in temperature of the body of the solar cell 1, which is to be a baseline, by inputting the calculated amount together with the ambient temperature information from the temperature sensor 44 placed at a location where an effect of heat generation of the solar cell 1 itself does not reach into the determination circuit 42B1. In addition, a more precise determination on activation can be made. In such a detection of ambient temperature information, besides the temperature sensor 44 such as a piezoelectric element, it is possible to use a T proportional circuit disposed in a control circuit, a temperature sensor for the fail-safe purpose which is installed near the power instrument 2, or the like.

In sum, the activation determining circuit 4B1 extracts only rise in temperature for the amount of heat generated, which is more accurate, by the power generation of the solar cell 1 from the temperature ratio of the temperature of the solar cell 1 itself that is generated when the solar cell 1 generates power by receiving light and the ambient temperature to activate the charging control circuit 3 when the amount of power generated by the solar cell calculated therefrom is equal to or greater than the amount of driving power for the charging control circuit 3.

As yet another variant of the activation determining circuit 4B1, the activation determining circuit may be configured to extract temperature information of the solar cell 1 itself by using a temperature sensor 51 for converting the temperature of the solar cell 1 itself that is generated when the solar cell 1 generates power by receiving light to an electrical signal to activate a charging circuit when the amount of power generated by a solar cell calculated from the electrical signal is equal to or greater than the amount of driving power for the charging control circuit 3. The baseline amount of generated power in this case is the amount of generated power where an output power value from the solar cell 1 beyond the amount of power consumption that enables driving of the charging control circuit 3 is obtained.

Yet another variant of the activation determining circuit 4B1 has a determination circuit used as a 3B determination means for detecting a value of temperature of the solar cell 1 itself from solar cell temperature information from a temperature sensor used as a solar cell temperature information detecting means for converting a temperature of the solar cell 1 itself which is generated when the solar cell 1 generates power by receiving light to an electrical signal to output a switch controlling signal for turning on from off a switch SW2 used as a second switching means for turning on/off an output current from the solar cell 1 to the charging control circuit 3 and to commence controlling charging by the charging control circuit 3 at a point when the amount of power generated by a solar cell calculated from the detected temperature has reached the baseline amount of power generation.

Although it was not specifically explained in Embodiment 3, the activation determining circuit may be configured to further comprise a solar cell temperature information detecting means for detecting a value of rise in temperature of the solar cell 1 itself that is generated when the solar cell 1 generates power by receiving light, and to monitor an output current from the solar cell 1 to a reference potential to activate the charging control circuit 3 at a point when the amount of power generated by a solar cell calculated from the output current and the value of rise in temperature has reached a baseline amount of power generated. The baseline amount of generated power is the amount of power generated by the solar cell 1 where an output power value from the solar cell 1 beyond the amount of power consumption that enables driving of the charging control circuit 3 is obtained.

Embodiment 4

Embodiment 4 explains a case where power generated from heat using heat generated from a solar cell is used as a power source for the charging control circuit 3 and an activation determining circuit 4C described below.

Figure 6:
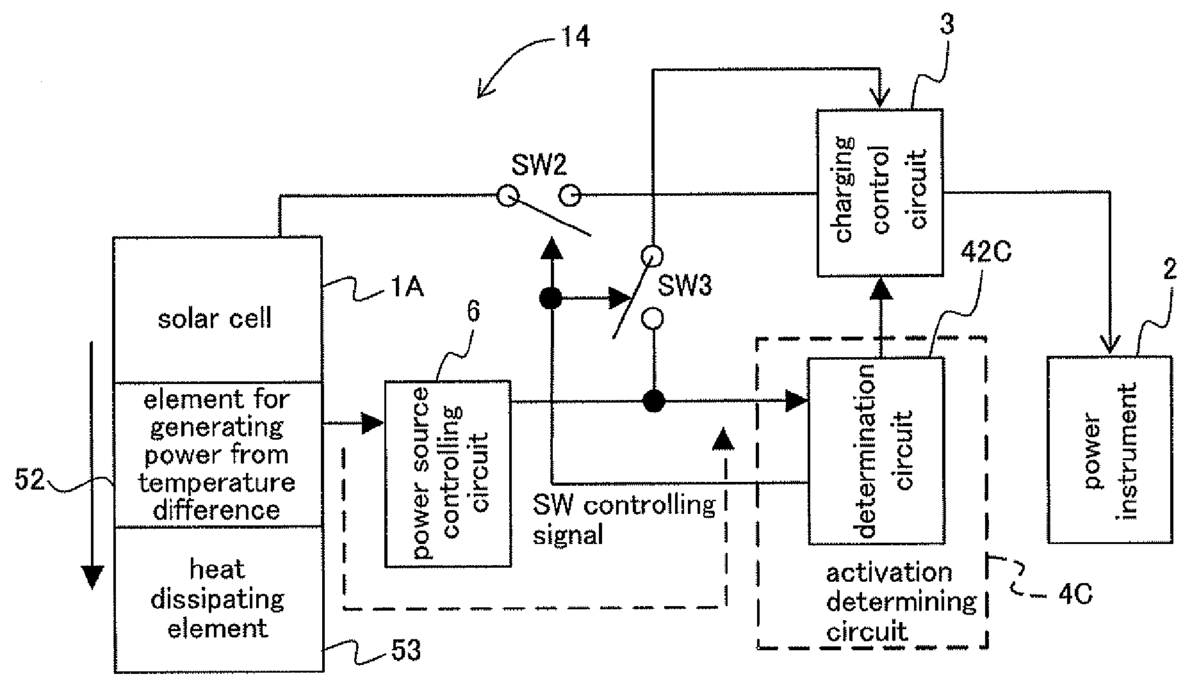
FIG. 6 is a block diagram illustrating an exemplary configuration of essential parts of a charging control unit in Embodiment 4 of the present invention.

FIG. 6 is a block diagram illustrating an exemplary configuration of essential parts of a charging control unit in Embodiment 4 of the present invention.

In FIG. 6, a charging control unit 14 of Embodiment 4 comprises: a charging control circuit 3 for controlling charging of a power instrument 2 used as a power retaining means such as a secondary battery or a super capacitor with power generated from a solar cell 1A that generates power by receiving light; an element for generating power from temperature differences 52 provided between the solar cell 1A and a heat dissipation element 53; a power source controlling circuit 6 for enabling a stable supply of thermoelectric power from the element for generating power from temperature difference 52; and an activation determining circuit 4C for activating the charging control circuit 3 at a point when a power value supplied from the power source controlling circuit 6 reaches a predetermined baseline power value. The predetermined baseline power value in this case is a value corresponding to an output power value from the solar cell 1 and the element for generating power from temperature difference 52 beyond current consumption that enables driving of the charging control circuit 3.

The activation determining circuit 4C has a determination circuit 42C used as a fourth determining means, which waits until thermoelectric power converted from heat generated by the solar cell 1A itself which is generated when the solar cell 1A generates power by receiving light has reached the predetermined baseline power value and stabilizes, and outputs a switch controlling signal for turning on from off each of switch SW2 and switch SW3 used as a second switching means and a third switching means for turning on/off output power from the solar cell 1 and the power source controlling circuit 6 to the charging control circuit 3 and commencing controlling the charging by the charging control circuit 3 at a point when the thermoelectric power has reached the predetermined baseline power value.

In this manner, heat generated by the solar cell 1A itself that is generated when the solar cell 1A generates power by receiving light is converted to a voltage, current or power by the element for generating power from temperature difference 52 to use the converted voltage, current, or power as an activation condition of the charging control circuit 3 and as driving power supplement for the determination circuit 42C and the charging control circuit 3. The solar cell 1A itself is cooled and power generation efficiency is enhanced by the element for generating power from temperature difference 52.

With the above-described configuration, heat generated when the solar cell 1 generates power can be used to draw out thermoelectric power from the element for generating power from temperature difference 52 connected between the solar cell 1 and the heat-dissipating element 53. The drawn out thermoelectric power is stabilized as an output current by the power source controlling circuit 6 and the output current is input into the determination circuit 42C of the activation determining circuit 4C.

Next, after judging that power of either the solar cell 1A or the element for generating power from temperature difference 52 or the total thereof is power that can drive the charging control circuit 3, i.e., at a point when it is judged that power obtained by passing thermoelectric power from the element for generating power from temperature difference 52 though the power source controlling circuit 6 has reached a predetermined baseline power value and has stabilized, the determination circuit 42C of the activation determining circuit 4C turns on each of the switch SW2 and the switch SW3 and outputs an activation controlling signal to the charging control circuit 3.

Thus, according to Embodiment 3, it is possible to draw out thermoelectric power from the element for generating power from temperature difference 52 that is connected between the solar cell 1 and heat dissipating element 53 by utilizing heat generated when the solar cell 1 generates power. In addition, it is possible to use such thermoelectric power as an activation condition of the charging control circuit 3 or as driving power supplement for the charging control circuit 3 and the determination circuit 42C. Thereby, driving of the charging control circuit 3 is started up earlier and the amount of power generated by the solar cell 1A can be used in charging more efficiently.

Embodiment 4 is configured so as to activate the charging control circuit 3 at a point when power obtained by passing thermoelectric power from the element for generating power from temperature difference 52 though the power source controlling circuit 6 has reached a predetermined baseline power value and has stabilized. However, the configuration is not limited thereto. The thermoelectric power from the element for generating power from temperature difference 52 may be used directly as a determination signal for the activation determining circuit 4C if signal outputting is possible, such that thermoelectric power from the element for generating power from temperature difference 52 is in a suitable range of an input rage of the activation determining circuit 4C.

Embodiment 5

Embodiment 5 will explain a case where a solar cell that is not running to generate power is detected for controlling to cut off such a solar cell from the charging control circuit 3 when a plurality of solar cells are provided and at least one of the plurality of solar cells is not running to generate power due to some type of effect, in order to prevent reverse flow of power from the charging control circuit 3 and to perform efficient controlling of charging.

Figure 7:
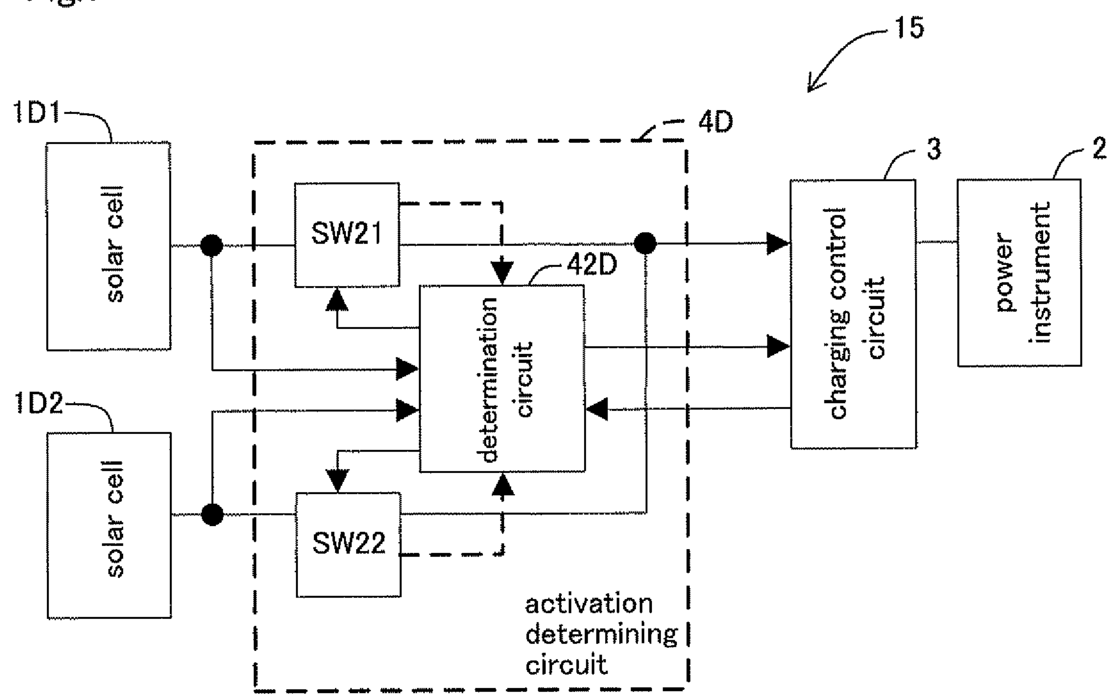
FIG. 7 is a block diagram illustrating an exemplary configuration of essential parts of a charging control unit in Embodiment 5 of the present invention.

FIG. 7 is a block diagram illustrating an exemplary configuration of essential parts of a charging control unit in Embodiment 5 of the present invention.

In FIG. 7, a charging control unit 15 of Embodiment 5 is provided with a plurality of (herein, 2) solar cells 1D1 and 1D2, and switches SW1 and SW2 used as a switching means are each provided between the solar cells 1D1 and 1D2 and the charging control circuit 3, respectively. In a state where the solar cell 1D1 and the solar cell 1D2 are connected in parallel as such, when light hits the solar cell 1D1 and light does not hit the solar cell 1D2 due to a shadow, a cloud, a bird or the like, a current flows towards the solar cell 1D2 that is not generating power and power generating efficiency would decrease. For this reason, it is necessary to observe a current for each of the solar cells 1D1 and 1D2 to control the opening and closing of the switch SW21 between the solar cell 1D1 and the charging control circuit 3 and the switch SW22 between the solar cell 1D2 and the charging control circuit 3.

A determination circuit 42D of an activation determining circuit 4D determines whether an output current from each of the solar cells 1D1 and 1D2 has reached a baseline current value for each of the solar cell 1D1 and 1D2, and performs a control so that only an output terminal of the solar cell that has reached the baseline current value is connected to the charging control circuit 3 to activate the charging control circuit 3 at a point when the baseline current value has been reached. The determination circuit 42D activates the charging control circuit 3 when at least one determination for activation for the plurality of solar cells 1D1 and 1D2 is detected. In this case, the charging control circuit 3 is configured so that an activation state is maintained when charging control by the activation determining circuit 4D is commenced at an initial stage of activation.

Further, the determination circuit 42D activates the charging control circuit 3 at a point when the sum of output currents from the plurality of solar cells 1D1 and 1D2 has reached the baseline current value used as an activation determination prescribed value, which is set as a current with which charging control can be performed. In this case, controlling is performed so that: each of the differences between an output current of each of the plurality of solar cells 1D1 and 1D2 is compared; and since there is a possibility of a current flowing in reverse from a solar cell with large amount of power generation to a solar cell with a low amount of power generation when each difference reaches a predetermined value, the connection of the solar cell with the low amount of power generation to the charging control circuit 3 is cut off by the switches SW21 or SW22 and the amount of power generated by the solar cell with the low amount of power generation is subtracted from the sum of output currents for comparison with the baseline current value.

The determination circuit 42D detects the presence or absence of power generation for each of the two solar cells 1D1 and 1D2 and performs a control to shut off a switch between a solar cell, which is determined as not reaching the baseline current value and not running to generate power, and the charging control circuit 3.

For example, a charging control stopping condition for one of the solar cells 1D1 and 1D2 that is not running to generate power is set to be at a point where output currents do not reach the baseline current value (or low level baseline current value for stopping the charging control) and a predetermined time has passed by monitoring the output currents from the solar cells 1D1 and 1D2. Further, a charging control stopping condition after charging control of the charging control circuit 3 has commenced is set to be a point when a reverse flow current from the charging control circuit 3 to the solar cell side is detected.

Figure 8:
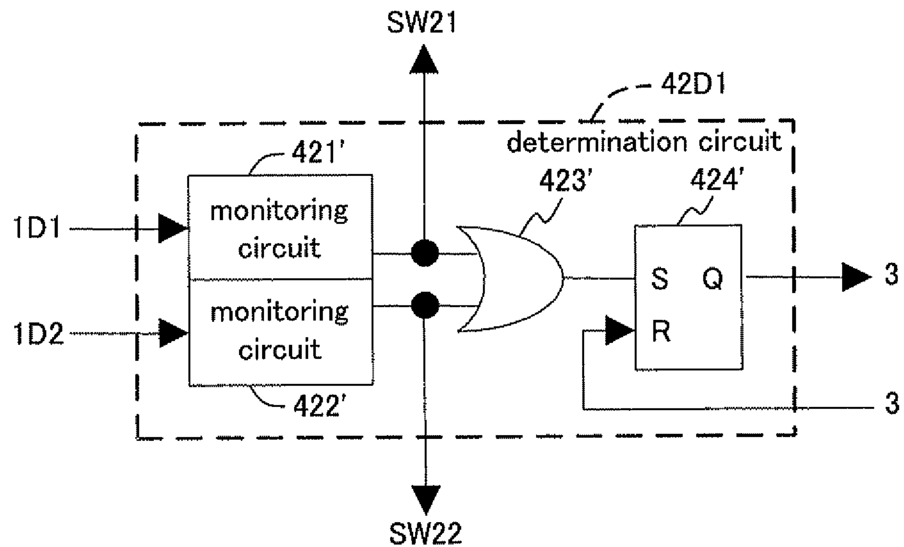
FIG. 8 is a block diagram illustrating the first exemplary configuration of the determination circuit of FIG. 7.
Figure 9:
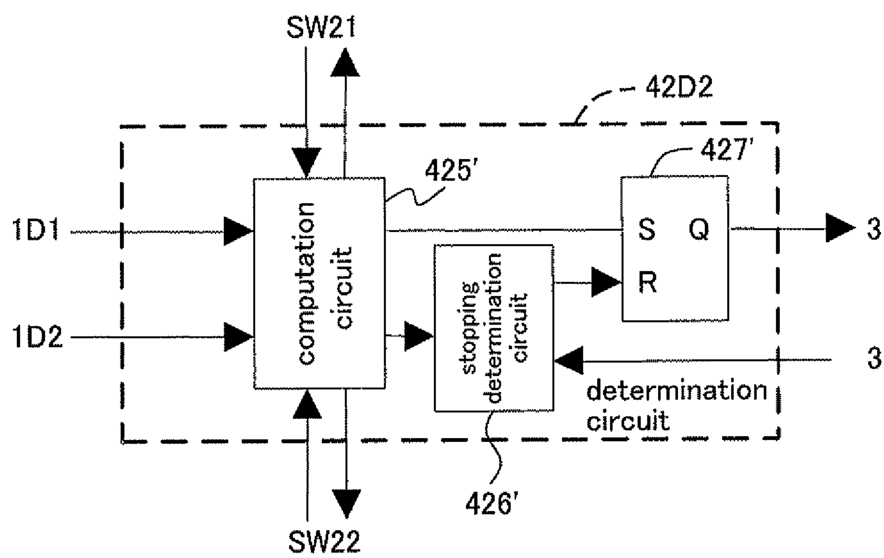
FIG. 9 is a block diagram illustrating the second exemplary configuration of the determination circuit of FIG. 7.

FIGS. 8 and 9 illustrate circuit diagrams of two types of determination circuits 42D1 and 42D2 for individually observing the plurality of (herein, 2) solar cells 1D1 and 1D2 to control the opening and closing of each of the switches SW21 and SW22.

FIG. 8 is a block diagram illustrating the first exemplary configuration of the determination circuit 42D of FIG. 7.

As illustrated in FIG. 8, a monitoring circuit 421' for monitoring an output current from the solar cell 1D1 and a monitoring circuit 422' for monitoring an output current from the solar cell 1D2 is provided. Each of the monitoring circuits 421' and 422' compares and inspects whether power that can drive the charging control circuit 3 is generated at the solar cells 1D1 and 1D2 to output a high level or low level digital signal. Such a high level or low level digital signal is used for controlling the switches SW21 and SW22, and is input into a logic circuit 423' (herein, an OR gate) and then input into a latch circuit 424' for maintaining the state. For this reason, the charging control circuit 3 can be activated by an output from the determination circuit 42D1 if one of the connected monitoring circuits 421' and 422' satisfies a condition.

FIG. 9 is a block diagram illustrating the second exemplary configuration of the determination circuit 42D of FIG. 7.

As illustrated in FIG. 9, each output current of the solar cells 1D1 and 1D2 is input into a computation circuit 425'. The computation circuit 425' determines whether the sum of generated power of both solar cells 1D1 and 1D2 can drive the charging control circuit 3. Thereby, charging operation is materialized in a wider range of power generation. However, even if the sum of generated power is power that can drive the charging control circuit 3, when there is a significant different in generated power in each of the solar cells 1D1 an 1D2, a current flows from one of the solar cells 1D1 an 1D2 with higher power generation to the other one of the solar cells 1D1 an 1D2 with lower power generation, resulting in possibly decreasing the total amount of generated power. Thus, the following measure becomes necessary.

Amount of power generated by solar cell 1D1>>amount of power generated by solar cell 1D2→switch SW21 is shorted and the switch SW22 is opened.

Amount of power generated by solar cell 1D1<<amount of power generated by solar cell 1D2→switch SW21 is opened and the switch SW22 is shorted.

Since a determination baseline of the control described above is affected by the characteristic of the solar cells 1D1 and 1D2, it is necessary to observe the solar cells 1D1 and 1D2 that are used for optimal setting. Even after activating the charging control circuit 3, a change in the amount of power generated occurs independently for each of the solar cells 1D1 and 1D2. Thus, a reverse flow determining function is provided in each of the switches SW21 and SW22. When this is detected, the computation circuit 425' controls to open the corresponding switch SW21 or SW22. A stopping condition of the charging control circuit 3 is input from the charging control circuit 3 side, similar to the cases of the above-described Embodiments 1-4. However, when a reverse flow determination occurs at all of the switches SW21 and SW22, it can be determined that power is not generated. Thus, a stopping condition by computation circuit 425'→stopping determination circuit 426'→latch circuit 427' may also be enforced.

Thus, according to Embodiment 5, power generated by the plurality of the solar cells 1D1 an 1D2 can be effectively controlled for charging. In this case, the determination circuit 42D detects the presence or absence of power generation for each of the plurality of the solar cells 1D1 and 1D2, and controls to cut off a switch between a solar cell, which is determined as not reaching a baseline current value and as not running to generate power, and the charging control circuit 3. Thus, it is possible to prevent a current from flowing toward the solar cell 1D2 side that is not generating power to decrease power generation efficiency.

Embodiment 6

When the load on the charging control circuit 3 is lightened, an output voltage of the solar cell 1 increases. However, in Embodiment 6, a case will be explained where impedance of a group of variable resistances 45 is decreased so that the output voltage of the solar cell 1 is in the input range of the charging control circuit 3.

Figure 10:
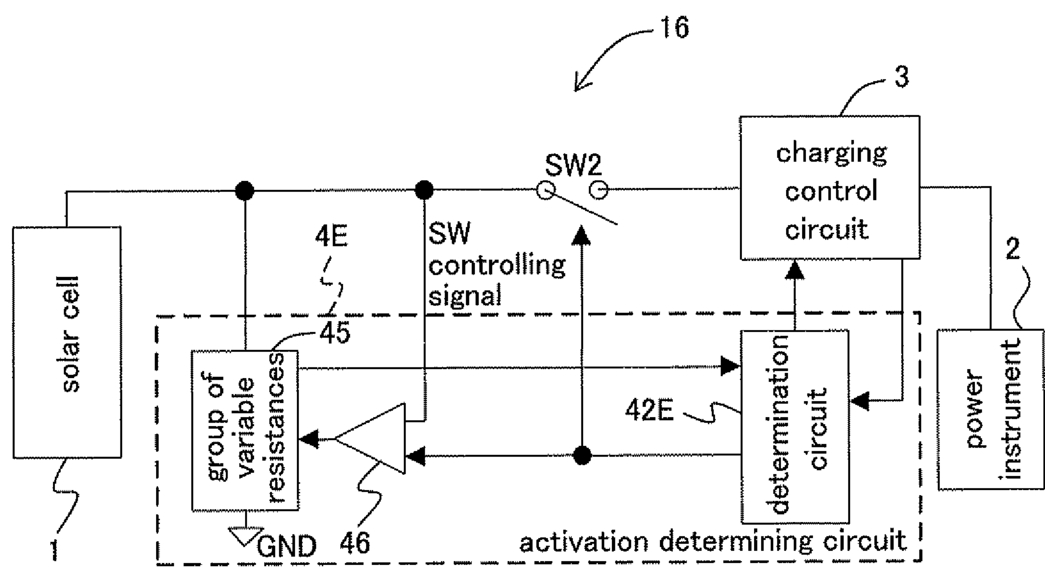
FIG. 10 is a block diagram illustrating an exemplary configuration of essential parts of a charging control unit in Embodiment 6 of the present invention.

FIG. 10 is a block diagram illustrating an exemplary configuration of essential parts of a charging control unit in Embodiment 6 of the present invention.

In FIG. 10, a charging control unit 16 of Embodiment 6 comprises: a group of variable resistances 45 (plural value) used as a monitoring circuit of an output current provided between an output terminal of a solar cell 1 and a reference potential output terminal (herein, GND potential output terminal); a comparator 46 (differential amplifier) for comparing a voltage value at the output terminal of the solar cell 1 with an output baseline voltage value to enable controlling the impedance of the group of variable resistances 45; and a determination circuit 42E used as a determination means for linking the output terminal of the solar cell 1 and the charging control circuit 3 via a switch SW2 and increasing the impedance of the group of variable resistance 45 by controlling the output baseline voltage value and activating the charging control circuit 3 at a point when an output current detected at the group of variable resistances 45 has reached a baseline current value.

When an output voltage of the solar cell 1 increases to a voltage equal to or greater than an input range of the charging control circuit 3 by the load of the charging control circuit 3 lightening, the determination circuit 42E is configured to inhibit the output voltage of the solar cell 1 by decreasing the impedance of the group of variable resistances 45 so that the output voltage is within the input range of the charging control circuit 3 from the point when a voltage value at the output terminal of the solar cell 1 and a baseline voltage value are compared with the comparator 46 and the voltage value of the output terminal has reached the baseline voltage value.

Figure 11:
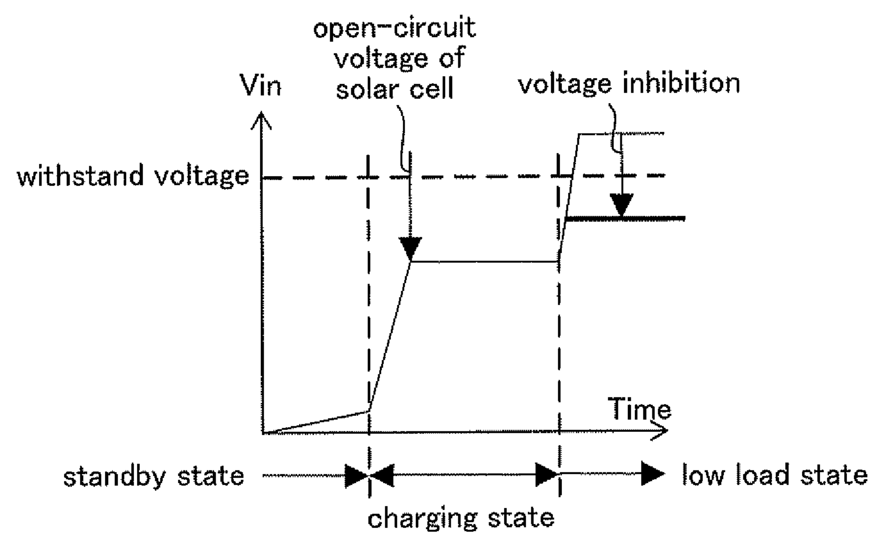
FIG. 11 is a diagram illustrating a solar cell output voltage Vin in the charging control unit of FIG. 10.

FIG. 11 is a diagram illustrating a solar cell output voltage Vin in the charging control unit of FIG. 10.

As illustrated in FIG. 11, when light is irradiated on the solar cell 1, the solar cell output voltage Vin increases by the impedance of the group of variable resistances 45, which is a monitoring circuit. When the determination circuit 42E meets an activation condition, the switch SW2 is shorted as the impedance of the group of variable resistances 45 increases. The charging control circuit 3 is then activated and charging of the power instrument commences.

Next, an output voltage of the solar cell 1 is fixed to a constant voltage while MPPT control is performed by the charging control circuit 3. However, when charging of the power instrument 2 is completed, a current no longer flows. Thus, a load of the charging control circuit 3 lightens, and in turn the voltage of the solar cell 1 increases up to the open-circuit voltage of the solar cell 1. The increase in voltage demands a wide-ranging input range for the charging control circuit 3 to be connected. For example, in the solar cell 1 with 10 single crystals in series, the voltage is equal to or greater than 7 V under no-load condition at normal temperature, and the voltage increases to about 8 V at −20° C. due to a negative temperature characteristic. For this reason, the voltage is equal to or greater than the withstand voltage of a power source IC with a withstand voltage of 5V and thus a power source IC having a withstand voltage of 10 V line is required. Power source ICs with a high withstand voltage is inferior to power source ICs with a low withstand voltage in terms of capability such as chip area/characteristic. In addition, deterioration in characteristics becomes even more considerable in a state of high temperature and a high load current and where an output voltage of the solar cell 1 decreases.

To this problem, a measure is taken by using the group of variable resistances 45 in a monitoring circuit section, as illustrated in FIG. 11. Since the group of variable resistances 45 exerts a high load for the solar cell 1 when transitioning from a standby state to a charging state, a high impedance state is desirable. Although an output voltage from the solar cell 1 increase in a low load state where a current does not flow, it is possible to inhibit the increase in voltage by decreasing the impedance of the group of variable resistances 45 so that a voltage is not equal to or greater than the withstand voltage for the output voltage from the solar cell 1 in order to materialize a charging control circuit 3 and an activation determining circuit 4E with low withstand voltage process for cost/characteristic considerations for each circuit structure.

Thus, according to Embodiment 6, although an output voltage of the solar cell 1 increases at a low load state of the charging control circuit 3 where charging of the power instrument 2 has completed and a current no longer flows, it is possible to inhibit an increase in voltage of an output voltage of the solar cell 1 by lowering the impedance of the group of variable resistances 45 so that the output voltage of the solar cell 1 is in the input range of the charging control circuit 3. Thereby, it is possible to materialize a charging control circuit 3 with a low withstand voltage.

Embodiment 7

Embodiment 7 will explain a case of regeneration for ameliorating a memory effect of a battery used as a power retaining means.

Figure 12:
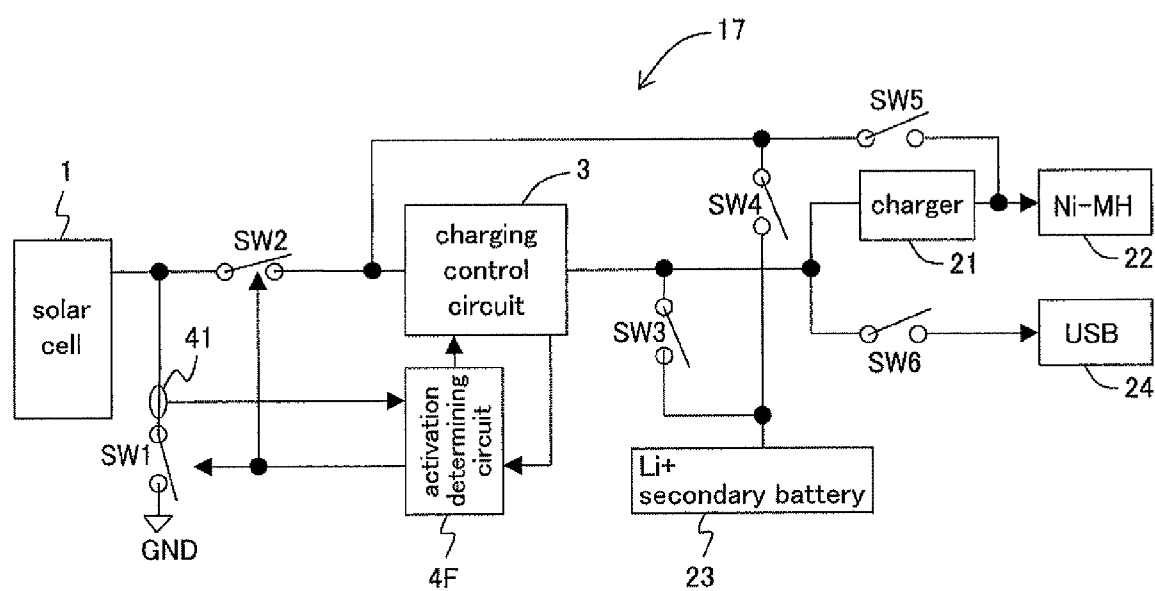
FIG. 12 is a block diagram illustrating an exemplary configuration of essential parts of a charging control unit in Embodiment 7 of the present invention.
Figure 13:
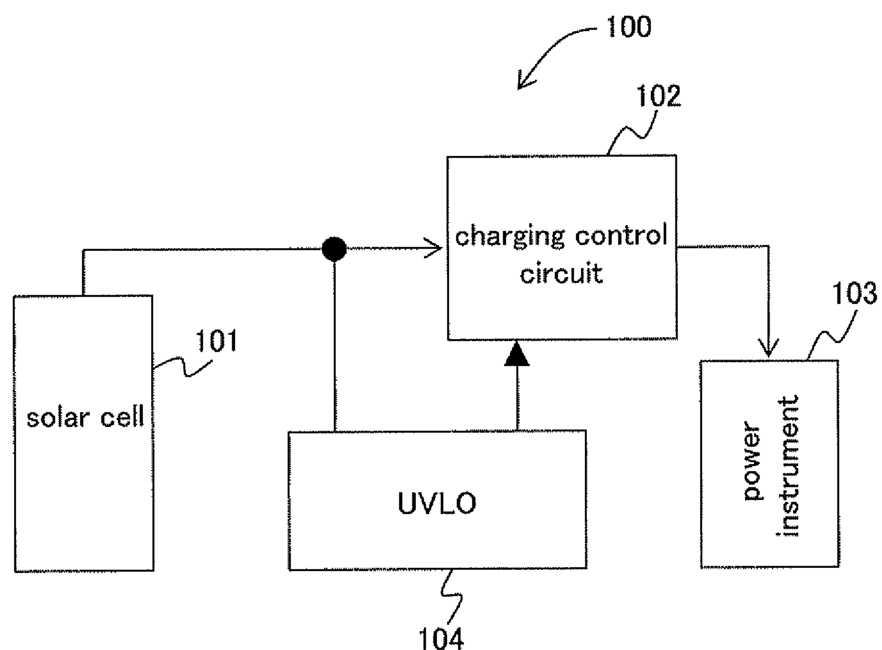
FIG. 13 is a block diagram illustrating an exemplary configuration of essential parts of a conventional charging control unit.
Figure 14:
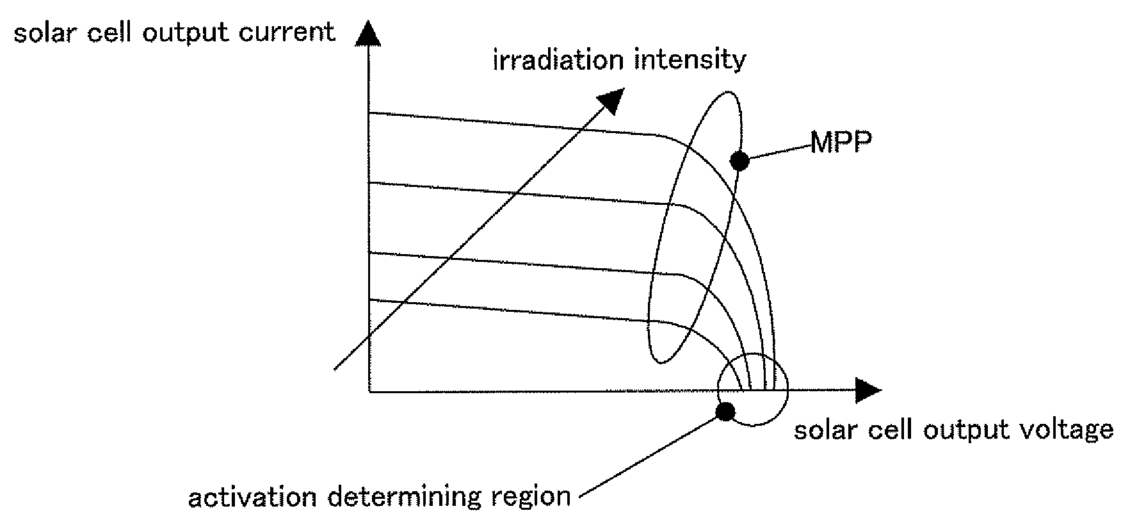
FIG. 14 is a diagram illustrating an output voltage-output current characteristic of a solar cell with photoirradiation intensity as a parameter.

FIG. 12 is a block diagram illustrating an exemplary configuration of essential parts of a charging control unit in Embodiment 7 of the present invention.

In FIG. 12, a charging control unit 17 of Embodiment 7 comprises: a first switch SW1 connected between an output terminal of a solar cell 1 and a low potential terminal (herein, a GND terminal); a second switch SW2 connected between the output terminal of the solar cell 1 and a charging control circuit 3 that draws power from the solar cell 1; an activation determining circuit 4F for controlling the activation of the charging control circuit 3 when the amount of current flowing to the second switch SW2 is set equal to or greater than a set value for determining activation (baseline current value); a third switch SW3 connected between an output terminal of the charging control circuit 3 and a first power retaining device (Li+ secondary batter 23); a fourth switch SW4 connected between an input terminal of the charging control circuit 3 and the first power retaining device (Li+ secondary battery 23); a charger 21 for a second power retaining device, connected between the output terminal of the charging control circuit 3 and the second power retaining device (nickel-metal hydride battery 22); a fifth switch SW5 connected between an output terminal of the charger 21 for the second power retaining device and the input terminal of the charging control circuit 3; and a sixth switch SW6 connected between the output terminal of the charging control circuit 3 and a USB 24.

The activation determining circuit 4F of the charging control unit 17 shorts the second switch SW2 and the third switch SW3 and opens the rest of the switches SW4-SW6 when charging the first power retaining device (Li+ secondary battery 23) with electric power from the solar cell 1. Further, when the second power retaining device (nickel metal hydride battery 22) is charged, the charger 21 for the second power retaining device is activated to charge the second power retaining device in parallel with the first power retaining device (Li+ secondary battery 23). When only the second power retaining device (nickel metal hydride battery 22) is charged, the third switch SW3 is opened for charging. Furthermore, when it is judged that power of the solar cell 1 is insufficient, charging is performed from the first power retaining device (Li+ secondary battery 23) to the second power retaining device (nickel metal hydride battery 22) after the second switch SW2 is shorted, the charging control circuit 3 is stopped, and the rest of the switches are opened.

When a memory effect is manifested in the second power retaining device (nickel metal hydride battery 22) and power retaining capability decreases, the activation determining circuit 4F of the charging control unit 17 eliminates a memory effect and regenerates power by: stopping the charger 21 for the second power retaining device; shorting the fifth switch SW5 and the fourth switch SW4; opening the rest of the switches; and regenerating power stored in the second power retaining device (nickel metal hydride battery 22) to the first power retaining device (Li+ secondary battery 23) to perform over-discharge.

With the above-described configuration, the charging control unit 17 of Embodiment 17 presumes temporarily storing power generated by the solar cell 1 in the Li+ secondary battery 23 and supplying the power to applications such as a mobile phone device via USE 24 or to a secondary batter such as commonly used nickel metal hydride battery 22. An output to the USE 24, when performed from the Li+ secondary battery 23, is passed through a boost controlling circuit. This is because there is a potential difference, i.e., the voltage of the Li+ secondary battery 23 is 3.2 V-4.2V, whereas an output of the USB 24 is 5 V. For pathway discharge to the USB 24, the switch SW1 and switch SW6 are shorted and the switches SW3-SW5 are in an open state when power is generated from the solar cell 1. In terms of circuits, the charging control circuit 3 and the boost controlling circuit are running, and the charger 21 stops.

Further, when power is not generated by the solar cell 1, the charging control circuit 3 is stopped, the solar cell 1 and the Li+ secondary battery 23 are not electrically connected, and power retained by the Li+ secondary battery 23 is released directly to the USB 24 through the boost controlling circuit from the switch SW3 and switch SW6.

When the solar cell 1 is simultaneously generating power and controlling the charging to the nickel metal hydride battery 22, the switch SW1 and the switch SW5 are shorted the switch SW2 is in an open state, and charging of the nickel metal hydride battery 22 is controlled by the charger 21. At this time, it is desirable that the boost controlling circuit, which is a USB pathway, is stopped. The solar cell 1 and the Li+ secondary battery 23 are not electrically connected and power retained by the Li+ secondary battery 23 is released to the nickel metal hydride battery 22. Further, the nickel metal hydride battery 22 has a problem to be solved of memory effects. This is a phenomenon in which battery capacity appears to decrease by repeated charging. If this phenomenon is neglected, the amount of power that can be stored in the nickel metal hydride battery 22 decreases. When a normal phenomenon is exhibited, over-discharging (discharging until there is no remaining charge in a battery) is performed by a load device to which the nickel metal hydride battery 22 is connected, or a refresh feature (this feature is also an over-discharge), which is often built into the charger 21, is used. For both of such means, power stored in the nickel metal hydride battery 22 is discarded and lost. For this reason, the nickel metal hydride battery 22 is regenerated from memory effects without adding a complex circuit in order to decrease such loss.

Refreshing control having such a regeneration mechanism is performed by the charging control circuit 3. The charging control circuit 3 has an MPPT feature for efficiently drawing out power from the solar cell. However, a method of observing a fluctuating voltage when drawing out a current from the solar cell 1 is common for such an MPPT feature. This typically operates as a current limiting feature that “dynamically changes” as a power source control. For this reason, if voltage levels are close for the charging control circuit 3, the current limiting feature can be used to draw out power from the nickel metal hydride battery 22. The voltage per nickel metal hydride battery 22 is about 1.2 V, and the final discharging voltage is about 1 V. This is approximately equal to the input voltage level of a charging control system corresponding to two solar cells in series. When over-discharge of a common nickel metal hydride battery 22 is completed, an output is often cut off by an internal protective switch. For this reason, electrical discharge is performed up to an over-discharge state in order to perform controlling by the MPPT feature, i.e., by a protective feature using a current limiting feature that “dynamically changes”, and eliminate memory effects. At this time, the charging control circuit 3 charges the lithium ion secondary battery (Li+ secondary battery 23) in the same manner as the charging from the solar cell 1. Such regeneration of power can dramatically reduce loss of power which is needed for enhancing battery characteristics. Power supply from the solar cell 1 and charging control for the nickel metal hydride battery 22 are separated during refreshing having such a regeneration mechanism. For this reason, switches SW1 and SW4 are opened, and switches SW3 and SW5 are shorted. The charging control circuit 3 and the charger 21 are in an operating state.

Thus, according to Embodiment 7, when a memory effect is manifested in the second power retaining device (nickel metal hydride battery 22) and the power retaining capability thereof decreases, it is possible to eliminate a memory effect and regenerate power by: shorting the fifth switch SW6 and the third switch SW4; opening the rest of the switches; regenerating the first power retaining device (Li+ secondary battery 23) with power stored in the second power retaining device (nickel metal hydride battery 22); and performing over-discharging. Thus, such regeneration of power can dramatically reduce loss of power, which is needed for enhancing battery characteristics.

Embodiment 7 explained a case where regeneration is performed to ameliorate a memory effect of a battery used as a power retaining means by applying the above-described Embodiment 1. However, such a configuration is not limited thereto. Regeneration may be performed to ameliorate a memory effect of a batter used as a power retaining means by applying one of the above-described Embodiments 2-6. In addition, it is possible to appropriately combine at least two of the above-described Embodiments 1-7.

Embodiment 8

In the above-described Embodiments 1, 2, and 7, the activation determining circuits 4, 4A and 4F for activating the charging control circuit 3 by determining that an output current from the solar cell 1 has reached a baseline current value with the determination circuit 42 were illustrated, as illustrated in FIG. 1, FIG. 3, and FIG. 12. In the above-described Embodiment 3, the activation determining circuits 4B and 4B1 for activating the charging control circuit 3 by determining that a temperature value or a value of rise in temperature detected by the solar cell 1 or the amount of power generated by a solar cell calculated therefrom has reached a baseline temperature value, baseline value of rise in temperature or baseline amount of generated power with the determination circuit 42B or 42B1 were explained, as illustrated FIG. 5. In the above-described Embodiment 4, the activation determining circuit 4C for activating the charging control circuit 3 by determining that a power value supplied from the power source controlling circuit 6 or the element for generating power from temperature difference 52 has reached a baseline power value by the determination circuit 42C was explained, as illustrated in FIG. 6. In the above-described Embodiment 5, the activation determining circuit 4D for controlling to activate the charging control circuit 3 by determining whether each output current from the plurality of solar cells 1D1 and 1D2 has reached a baseline current value for each solar cell with the determination circuit 42C and connecting only an output terminal of a solar cell that has reached the baseline current value was explained, as illustrated in FIG. 7. In the above-described Embodiment 6, the activation determining circuit 4E for linking an output terminal of the solar cell 1 and the charging control circuit 3 and increasing impedance of a monitoring circuit to activate the charging control circuit 3 by determining that an output current detected by the monitoring circuit has reached a baseline current value with the determination circuit 42E was explained, as illustrated in FIG. 10.

Figure 15:
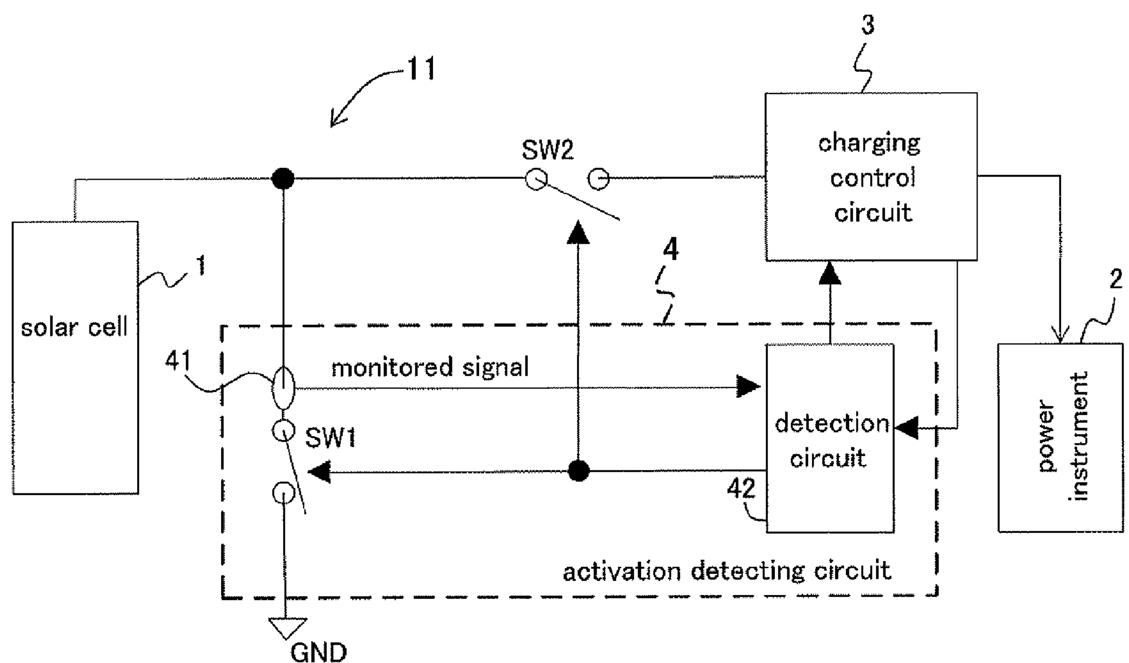
FIG. 15 is a block diagram illustrating an exemplary configuration of essential parts of a charging control unit in Embodiment 8 of the present invention (No. 1).
Figure 16:
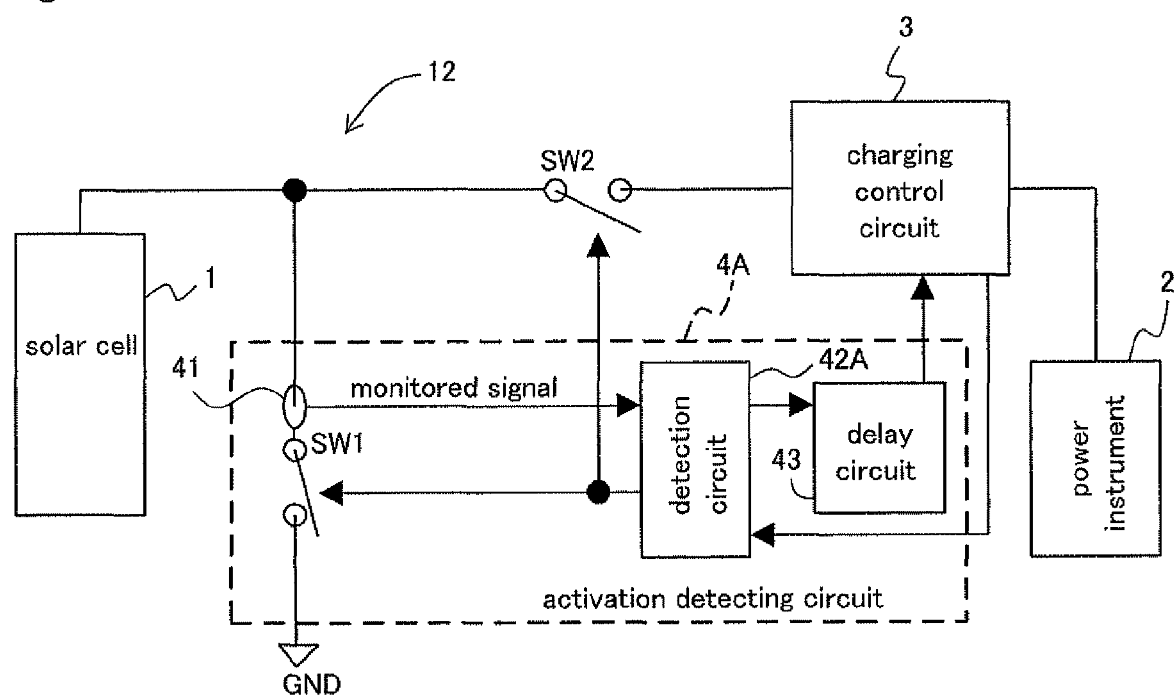
FIG. 16 is a block diagram illustrating an exemplary configuration of essential parts of a charging control unit in Embodiment 8 of the present invention (No. 2).
Figure 21:
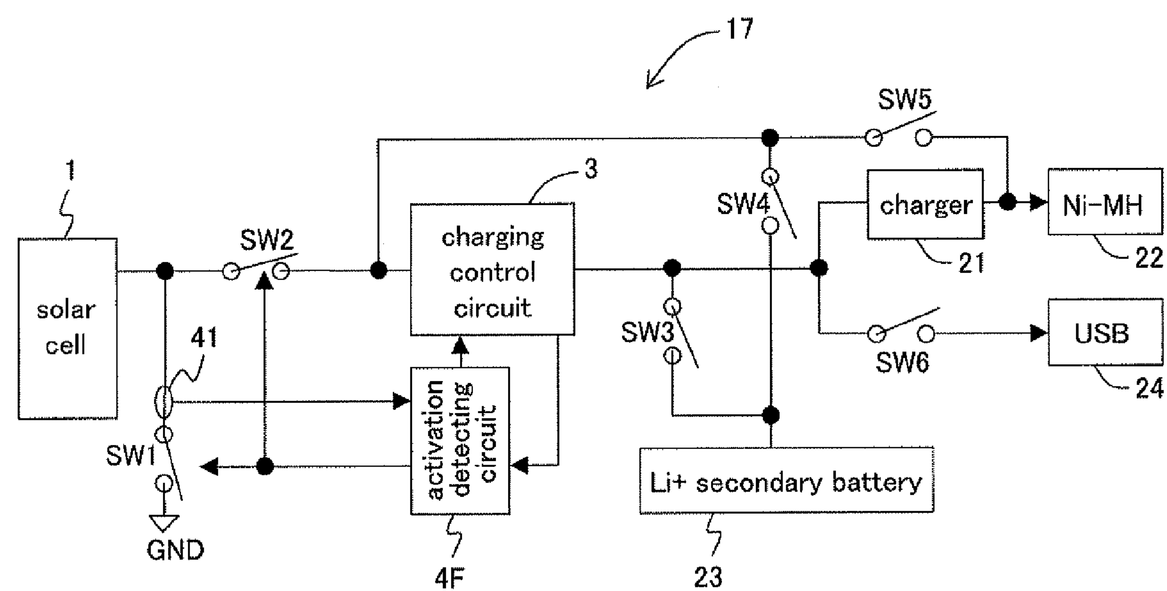
FIG. 21 is a block diagram illustrating an exemplary configuration of essential parts of a charging control unit in Embodiment 8 of the present invention (No. 7).

Embodiments are not limited to the above-described Embodiments 1-7. As illustrated in FIG. 15, FIG. 16, and FIG. 21, Embodiments may use the activation determining circuits 4, 4A, and 4F for activating the charging control circuit 3 by detecting that an output current from the solar cell 1 has reached a baseline current value with a detection circuit 42 or 42A. Such embodiments are different from the above-described Embodiments 1, 2, and 7 only in whether a determination circuit or detection circuit is used.

Figure 17:
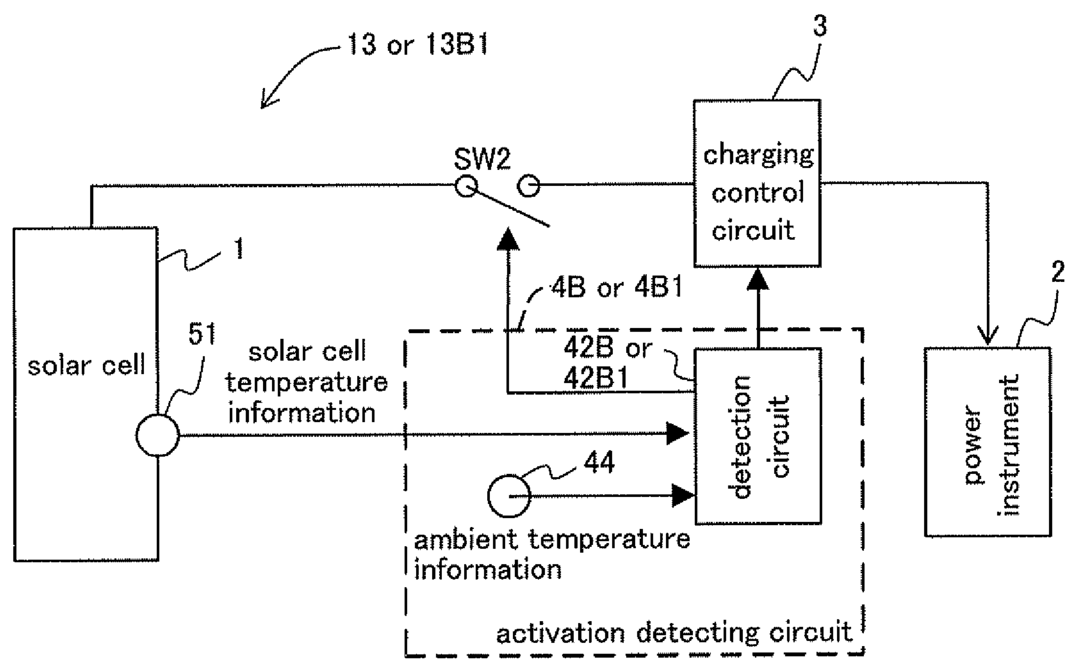
FIG. 17 is a block diagram illustrating an exemplary configuration of essential parts of a charging control unit in Embodiment 8 of the present invention (No. 3).

Embodiments may use an activation detecting circuit 4B or 4B1 for activating the charging control circuit 3 by detecting that a temperature value or a value of rise in temperature detected on the solar cell 1, or the amount of power generated by a solar cell calculated therefrom has reached a baseline temperature value, baseline value of rise in temperature, or the baseline amount of generated power with a detection circuit 42B or 42B1, as illustrated in FIG. 17. Such an embodiment is different from the above-described Embodiment 3 only in whether a determination circuit or a detection circuit is used.

Figure 18:
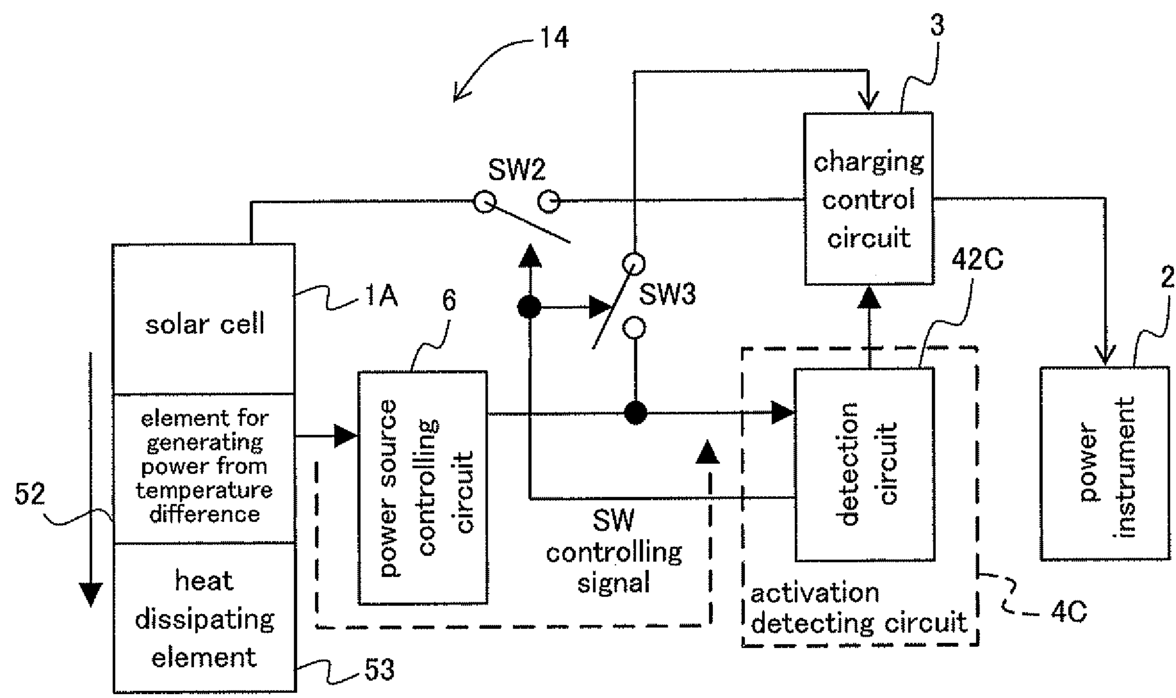
FIG. 18 is a block diagram illustrating an exemplary configuration of essential parts of a charging control unit in Embodiment 8 of the present invention (No. 4).

Embodiments may use an activation detecting circuit 4C for activating the charging control circuit 3 by detecting that a power value supplied from the power controlling circuit 6 or the element for generating power from temperature difference 52 has reached a baseline power value with the detection circuit 42B or 42B1, as illustrated in FIG. 18. Such an embodiment is different from the above-described Embodiment 4 only in whether a determination circuit or a detection circuit is used.

Figure 19:
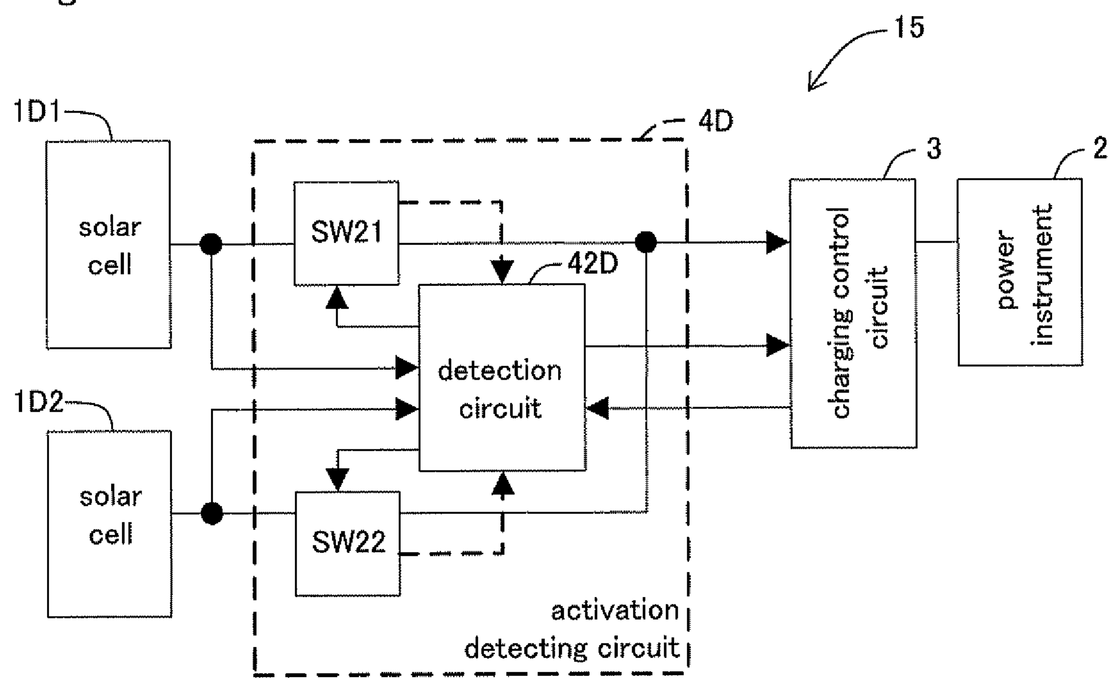
FIG. 19 is a block diagram illustrating an exemplary configuration of essential parts of a charging control unit in Embodiment 8 of the present invention (No. 5).

Embodiment may use an active detection circuit 4D for controlling to activate the charging control circuit 3 by determining whether each output current from the plurality of solar cells 1D1 and 1D2 has reached a baseline current value and detecting that a baseline current value has been reached with the determination circuit 42D to connect only an output terminal of a solar cell that has reached the baseline current value, as illustrated in FIG. 19. Such an embodiment is different from the above-described Embodiment 5 only in whether a determination circuit or a detection circuit is used.

Figure 20:
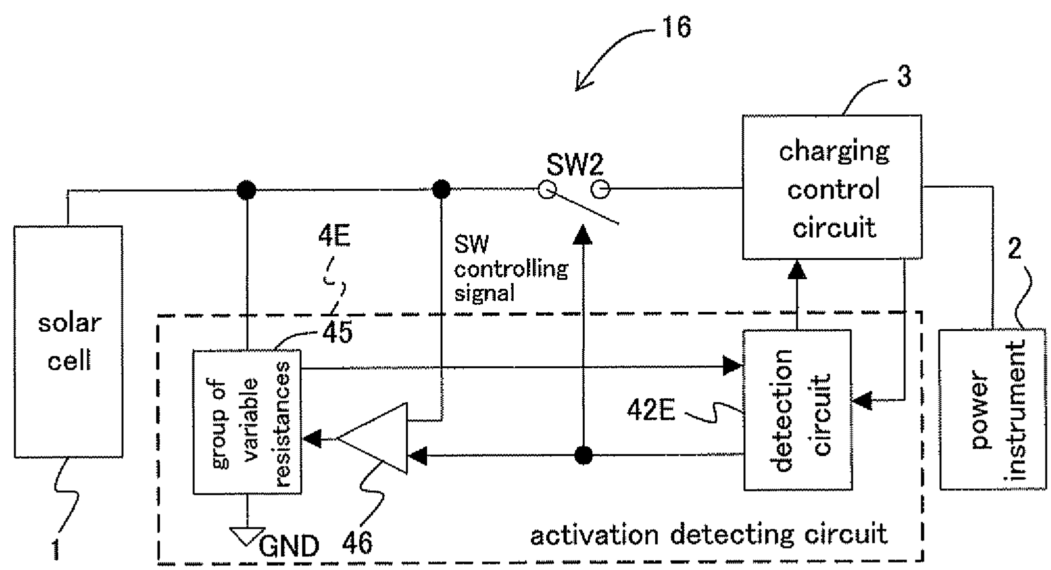
FIG. 20 is a block diagram illustrating an exemplary configuration of essential parts of a charging control unit in Embodiment 8 of the present invention (No. 6).

Embodiments may use an activation detecting circuit 4E for detecting that an output current detected by a monitoring circuit has reached a baseline current value with a detection circuit 42E, linking an output terminal of the solar cell 1 and the charging control circuit 3, increasing impedance of the monitoring circuit, and activating the charging control circuit 3, as illustrated in FIG. 20. Such an embodiment is different from the above-described Embodiment 6 only in whether a determination circuit or a detection circuit is used.

Other than detection processing by the above-described detection circuits, the working effect of each member is the same as in the above-described cases of Embodiments 1-7.

In sum, in the above-described Embodiment 2, the determination circuit 42A for determining that an output current from the solar cell 1 has reached a baseline current value has the comparator 423 for comparing a signal level of a monitored signal from the current monitoring section 41 and a determination baseline level from the determination baseline outputting section 422 and outputting a determination signal in accordance with the difference between the signal level of the monitored signal and the determination baseline level when the signal level of the monitored signal is greater than the determination baseline level. Similarly, the determination circuits of the above-described Embodiments 1-7 are also configured so that a determination signal is output from a comparator when a determination baseline level and a level of a signal to be measured are compared with the comparator and the level of the signal to be measured exceeds the determination baseline level. However, the configuration is not limited thereto. The determination circuit may be configured such that, for example, a threshold of a transistor is used to turn on/off to output a determination signal, without using a comparator. That is, the determination circuits of the above-described Embodiments 1-7 can be configured such that an output current from the solar cell 1 is divided with a plurality of voltage dividing resistors and the transistor is turned on at a point when a divided voltage exceeds the threshold of the transistor to output an activation determination signal from the determination circuit to the charging control circuit 3, without using a comparator. Further, as another instance, the determination circuit can be configured such that: a predetermined voltage that is equal to or greater than a threshold value of an AND circuit is input continuously as one side of inputs of the AND circuit; a level of a signal to be measured is input as the other side of inputs of the AND circuit; and an activation determination signal is output to the charging control circuit 3 from the AND circuit of the determination circuit when the level of the signal to be measured exceeds the threshold of the AND circuit.

The determination processing by the determination circuits of the above-described Embodiments 1-7 may be performed by any of the above-described comparator, the above-described transistor or the above-described AND circuit. Meanwhile, detection processing by the detection circuit of Embodiment 8 (FIGS. 15-21) is performed by not the above-described comparator, but by the above-described transistor or the above-described AND circuit. In sum, the detection circuit of Embodiment 8 is encompassed by the concept of the determination circuits of the above-described Embodiments 1-7.

As described above, the present invention is exemplified by the use of preferred Embodiments 1-8 of the present invention. However, the present invention should not be interpreted solely based on the Embodiments 1-8. It is understood that the scope of the present invention should be interpreted solely based on the claims. It is also understood that those skilled in the art can implement equivalent scope of technology, based on the description of the specific preferred Embodiments 1-8 of the present invention and common knowledge from the description of the detailed preferred embodiments of the present invention. Furthermore, it is understood that any patent, any patent application and any references cited in the present specification should be incorporated by reference in the present specification in the same manner as the contents are specifically described therein.

INDUSTRIAL APPLICABILITY

The present invention can be applied in the field of a charging control unit for controlling charging of a power retaining device such as a secondary battery or a super capacitor with power generated from a solar cell. According to the present invention, an activation determination means activates a charging control circuit by allowing an output current from a solar cell to flow and detecting that the output current, which does not greatly change, is equal to or greater than current consumption of the charging control circuit instead of the activation determining circuit monitoring an unstable output voltage, which greatly changes, from the solar cell as is the convention. Thus, the charging control circuit can be activated more precisely in comparison to a case where an output voltage is monitored under the condition that the charging control circuit is operated only by the amount of power generated by the solar cell.

The invention claimed is:

1. A charging control unit for controlling charging of a power retaining means with power from a solar cell that generates power by receiving light by a charging control circuit, the charging control unit, in order to charge an amount of power generated by the solar cell more efficiently, comprising:

an activation determining means for activating the charging control circuit by monitoring an output current from the solar cell to a reference potential and determining that the output current has reached a baseline current value, wherein the activation determining circuit comprises:

a current monitoring section for monitoring the output current from the solar cell;

a first switching means for turning on or off the current monitoring section to a reference potential side;

a second determination means for allowing the output current from the solar cell to flow from the current monitoring section to the reference potential side via the first switching means and monitoring the output current as a monitored current value to determine that the monitored current value has reached the baseline current value to output a switch controlling signal for turning off the first switching means and turning on from off a second switching means for turning on or off the output current from the solar cell to the charging control circuit; and a delay circuit for controlling the activation of the charging control circuit by outputting a delay signal that is delayed a predetermined time from a point when the monitored current has reached a predetermined current to the charging control circuit as an activation controlling signal, wherein a predetermined delay time from the point when the monitored current has reached the reference current value is a stable transition time of power fluctuation due to a rise in surface temperature of the solar cell.

2. A charging control unit according to claim 1, wherein the stable transition time of power fluctuation due to a rise in surface temperature of the solar cell is a time in which the monitored current fluctuates.

3. A charging control unit according to claim 1, wherein the baseline current value is a current equal to or greater than current consumption that enables driving the charging control circuit.

4. A charging control unit according to claim 1, wherein the charging control unit, in order to charge an amount of power generated by the solar cell more efficiently, comprises:

a solar cell temperature information detecting means for detecting a temperature value or a value of a rise in temperature of the solar cell itself that is generated when the solar cell generates power by receiving light; and an activation determining means for activating the charging control circuit by determining that the detected temperature value or the value of the rise in temperature or an amount of power generated by a solar cell calculated therefrom has reached a baseline temperature value, a baseline value of rise in temperature or a baseline amount of power generation.

5. A charging control unit according to claim 1, wherein the charging control unit, in order to charge an amount of power generated by the solar cell more efficiently, comprises:

an element for generating power from temperature differences provided between a solar cell that generates power by receiving light and a heat dissipation element;

a power source controlling circuit for enabling a supply of thermoelectric power from the element for generating power from temperature difference as a power source; and an activation determining means for activating the charging control circuit by determining that a power value supplied from the power source controlling circuit or the element for generating power from temperature difference has reached a baseline power value.

6. A charging control unit according to claim 1, wherein a plurality of solar cells are provided, and each switching means is provided between the plurality of solar cells and the charging control circuit, and the activation determining means detects the presence or absence of power generation for each of the plurality of solar cells and performs a control to shut off a switching means between a solar cell determined as not running to generate power and the charging control circuit.

7. A charging control unit according to claim 6, wherein the charging control circuit maintains an activation state when charging control by the activation determining means is commenced.

8. A charging control unit according to claim 6, wherein a charging control stopping condition for the solar cell that is not running to generate power is set to be at a point where output current does not reach the baseline current value during a predetermined period when the output current from the solar cell is monitored.

9. A charging control unit for controlling charging of a power retaining means with power from a solar cell that generates power by receiving light by a charging control circuit, the charging control unit, in order to charge an amount of power generated by the solar cell more efficiently, comprising:

an activation determining means for activating the charging control circuit by monitoring an output current from the solar cell to a reference potential and determining that the output current has reached a baseline current value, wherein the activation determining circuit comprises:

a current monitoring section for monitoring the output current from the solar cell;

a first switching means for turning on or off the current monitoring section to a reference potential side;

a second determination means for allowing the output current from the solar cell to flow from the current monitoring section to the reference potential side via the first switching means and monitoring the output current as a monitored current value to determine that the monitored current value has reached the baseline current value to output a switch controlling signal for turning off the first switching means and turning on from off a second switching means for turning on or off the output current from the solar cell to the charging control circuit; and a delay circuit for controlling the activation of the charging control circuit by outputting a delay signal that is delayed a predetermined time from a point when the monitored current has reached a predetermined current to the charging control circuit as an activation controlling signal, wherein a predetermined delay time from the point when the monitored current has reached the reference current value is set to 0 when driving power for the charging control circuit can be met even when an amount of power generation decreases due to a rise in temperature which is presumed during an initial determination of the amount of power generation comparing the monitored current to the predetermined current value.

10. A charging control unit according to claim 9, wherein the baseline current value is a current equal to or greater than current consumption that enables driving the charging control circuit.

11. A charging control unit according to claim 9, wherein the charging control unit, in order to charge an amount of power generated by the solar cell more efficiently, comprises:

a solar cell temperature information detecting means for detecting a temperature value or a value of a rise in temperature of the solar cell itself that is generated when the solar cell generates power by receiving light; and an activation determining means for activating the charging control circuit by determining that the detected temperature value or the value of the rise in temperature or an amount of power generated by a solar cell calculated therefrom has reached a baseline temperature value, a baseline value of rise in temperature or a baseline amount of power generation.

12. A charging control unit according to claim 9, wherein the charging control unit, in order to charge an amount of power generated by the solar cell more efficiently, comprises:

an element for generating power from temperature differences provided between a solar cell that generates power by receiving light and a heat dissipation element;

a power source controlling circuit for enabling a supply of thermoelectric power from the element for generating power from temperature difference as a power source; and an activation determining means for activating the charging control circuit by determining that a power value supplied from the power source controlling circuit or the element for generating power from temperature difference has reached a baseline power value.

13. A charging control unit according to claim 9, wherein a plurality of solar cells are provided, and each switching means is provided between the plurality of solar cells and the charging control circuit, and the activation determining means detects the presence or absence of power generation for each of the plurality of solar cells and performs a control to shut off a switching means between a solar cell determined as not running to generate power and the charging control circuit.

14. A charging control unit according to claim 13, wherein the charging control circuit maintains an activation state when charging control by the activation determining means is commenced.

15. A charging control unit for controlling charging of a power retaining means with power from a solar cell that generates power by receiving light by a charging control circuit, the charging control unit, in order to charge an amount of power generated by the solar cell more efficiently, comprising:

an activation determining means for activating the charging control circuit by monitoring an output current from the solar cell to a reference potential and determining that the output current has reached a baseline current value, wherein the activation determining circuit comprises:

a current monitoring section for monitoring the output current from the solar cell;

a first switching means for turning on or off the current monitoring section to a reference potential side;

a second determination means for allowing the output current from the solar cell to flow from the current monitoring section to the reference potential side via the first switching means and monitoring the output current as a monitored current value to determine that the monitored current value has reached the baseline current value to output a switch controlling signal for turning off the first switching means and turning on from off a second switching means for turning on or off the output current from the solar cell to the charging control circuit; and a delay circuit for controlling the activation of the charging control circuit by outputting a delay signal that is delayed a predetermined time from a point when the monitored current has reached a predetermined current to the charging control circuit as an activation controlling signal, wherein a predetermined delay time from the point when the monitored current has reached the reference current value is a fixed value determined from a product structure of the solar cell when an amount of power generation decreases due to a rise in temperature which is presumed during an initial determination of the amount of power generation and driving power for the charging control circuit cannot be met.

16. A charging control unit according to claim 15, wherein the baseline current value is a current equal to or greater than current consumption that enables driving the charging control circuit.

17. A charging control unit according to claim 15, wherein the charging control unit, in order to charge an amount of power generated by the solar cell more efficiently, comprises:

a solar cell temperature information detecting means for detecting a temperature value or a value of a rise in temperature of the solar cell itself that is generated when the solar cell generates power by receiving light; and an activation determining means for activating the charging control circuit by determining that the detected temperature value or the value of the rise in temperature or an amount of power generated by a solar cell calculated therefrom has reached a baseline temperature value, a baseline value of rise in temperature or a baseline amount of power generation.

18. A charging control unit according to claim 15, wherein the charging control unit, in order to charge an amount of power generated by the solar cell more efficiently, comprises:

an element for generating power from temperature differences provided between a solar cell that generates power by receiving light and a heat dissipation element;

a power source controlling circuit for enabling a supply of thermoelectric power from the element for generating power from temperature difference as a power source; and an activation determining means for activating the charging control circuit by determining that a power value supplied from the power source controlling circuit or the element for generating power from temperature difference has reached a baseline power value.

19. A charging control unit according to claim 15, wherein a plurality of solar cells are provided, and each switching means is provided between the plurality of solar cells and the charging control circuit, and the activation determining means detects the presence or absence of power generation for each of the plurality of solar cells and performs a control to shut off a switching means between a solar cell determined as not running to generate power and the charging control circuit.

20. A charging control unit according to claim 19, wherein the charging control circuit maintains an activation state when charging control by the activation determining means is commenced.

* * * * *